US008861870B2

(12) United States Patent
Shotton et al.

(10) Patent No.: US 8,861,870 B2
(45) Date of Patent: Oct. 14, 2014

(54) IMAGE LABELING WITH GLOBAL PARAMETERS

(75) Inventors: Jamie Daniel Joseph Shotton, Cambridge (GB); Pushmeet Kohli, Cambridge (GB); Andrew Blake, Cambridge (GB); Inmar-Ella Givoni, Toronto (CA)

(73) Assignee: Microsoft Corporation, Redmond, WA (US)

(*) Notice: Subject to any disclaimer, the term of this patent is extended or adjusted under 35 U.S.C. 154(b) by 84 days.

(21) Appl. No.: 13/034,989

(22) Filed: Feb. 25, 2011

(65) Prior Publication Data
US 2012/0219209 A1    Aug. 30, 2012

(51) Int. Cl.
*G06K 9/62* (2006.01)
*G06K 9/42* (2006.01)
*G06K 9/00* (2006.01)
*G06T 7/00* (2006.01)
*A63F 13/20* (2014.01)

(52) U.S. Cl.
CPC . *A63F 13/06* (2013.01); *G06K 9/42* (2013.01); *G06K 9/00335* (2013.01); *A63F 2300/1012* (2013.01); *G06K 9/62* (2013.01); *G06T 2207/30196* (2013.01); *G06T 7/004* (2013.01); *A63F 2300/6045* (2013.01); *A63F 2300/1087* (2013.01); *A63F 2300/8029* (2013.01); *A63F 2300/8011* (2013.01)
USPC ........... 382/224; 382/103; 382/111; 382/118; 382/154

(58) Field of Classification Search
CPC ............ G06K 9/6221; G06K 9/00677; G06K 9/6209; G06K 9/00335; G06K 9/00751; G06K 2019/06253; G06K 9/42; G06T 7/004; G06T 2207/30196; G06F 17/30259; A63F 2300/6045

USPC ................... 382/103, 111, 118, 159
See application file for complete search history.

(56) References Cited

U.S. PATENT DOCUMENTS 5,901,246 A * 5/1999 Hoffberg et al. .............. 382/209
5,930,392 A   7/1999 Ho
(Continued)

OTHER PUBLICATIONS

Agarwal, et al., "A Local Basis Representation for Estimating Human Pose from Cluttered Images", retrieved on Nov. 2, 2010 at <<http://lear.inrialpes.fr/pubs/2006/AT06/Agarwal-accv06.pdf>>, Proceedings of Asian Conference on Computer Vision (ACCV), Hyderabad, India, vol. 1, Jan. 2006, pp. 50-59.

(Continued)

*Primary Examiner* — Vu Le
*Assistant Examiner* — Aklilu Woldemariam
(74) *Attorney, Agent, or Firm* — Steve Wight; Judy Yee; Micky Minhas

(57) ABSTRACT

Image labeling with global parameters is described. In an embodiment a pose estimation system executes automatic body part labeling. For example, the system may compute joint recognition or body part segmentation for a gaming application. In another example, the system may compute organ labels for a medical imaging application. In an example, at least one global parameter, for example body height is computed for each of the images to be labeled. In an example, the global parameter is used to modify an image labeling process. For example the global parameter may be used to modify the input image to a canonical scale. In another example, the global parameter may be used to adaptively modify previously stored parameters of the image labeling process. In an example, the previously stored parameters may be computed from a reduced set of training data.

19 Claims, 16 Drawing Sheets

(56) References Cited

U.S. PATENT DOCUMENTS

| | | | |
|---|---|---|---|
| 6,741,756 B1 | 5/2004 | Toyama et al. | |
| 7,136,518 B2 * | 11/2006 | Griffin et al. | 382/133 |
| 7,519,201 B2 | 4/2009 | Yang et al. | |
| 7,715,597 B2 | 5/2010 | Costache et al. | |
| 7,756,325 B2 * | 7/2010 | Vetter et al. | 382/154 |
| 7,783,443 B2 * | 8/2010 | Aratani et al. | 702/94 |
| 7,974,475 B1 * | 7/2011 | Minter | 382/209 |
| 8,204,315 B2 * | 6/2012 | Madabhushi et al. | 382/224 |
| 2006/0280341 A1 * | 12/2006 | Koshizen et al. | 382/118 |
| 2007/0098254 A1 | 5/2007 | Yang et al. | |
| 2008/0187174 A1 * | 8/2008 | Metaxas et al. | 382/103 |
| 2010/0074538 A1 | 3/2010 | Mishra et al. | |
| 2010/0111370 A1 * | 5/2010 | Black et al. | 382/111 |
| 2010/0197390 A1 | 8/2010 | Craig et al. | |
| 2010/0278384 A1 | 11/2010 | Shotton et al. | |
| 2011/0075917 A1 * | 3/2011 | Cerosaletti et al. | 382/159 |

OTHER PUBLICATIONS

Guan, et al., "Estimating Human Shape and Pose from a Single Image", retrieved on Nov. 2, 2010 at <<http://www.cs.brown.edu/~black/Papers/guanICCV09.pdf>>, Intl Conference on Computer Vision (ICCV), Kyoto, Japan, Sep. 2009, pp. 1381-1388.

\* cited by examiner

IMAGE LABELING WITH GLOBAL PARAMETERS

BACKGROUND

There are many applications, for example gaming, human-computer interaction, security, telepresence or health-care, which require robust automatic image labeling. For example, the image labeling may be to label human or animal body parts for pose estimations, to label anatomical structures for medical image analysis and for other purposes.

For example a gaming application may require real-time identification and tracking of body parts for one or more players. The players will be in many different poses as they play the game and may have a wide range of heights and/or body shapes. In another example a doctor may wish to carry out rapid identification of anatomical structures on a medical image. However, differences in the angle or format of an image and the differences in size and shape of various anatomical structures between different subjects make this difficult.

Conventional intensity cameras may be used to obtain images for labeling. Recently, real-time depth cameras have been used in the process of human body pose tracking.

Existing image labeling systems may be slow to run and require a laborious training process with large sets of training data. For example, in order to recognize a wide range of human body shapes and sizes in different poses.

The embodiments described below are not limited to implementations which solve any or all of the disadvantages of known image labeling systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Image labeling with global parameters is described. In an embodiment a pose estimation system executes automatic body part labeling. For example, the system may compute joint recognition or body part segmentation for a gaming application. In another example, the system may compute organ labels for a medical imaging application. In an example, at least one global parameter, for example body height is computed for each of the images to be labeled. In an example, the global parameter is used to modify an image labeling process. For example the global parameter may be used to modify the input image to a canonical scale. In another example, the global parameter may be used to adaptively modify previously stored parameters of the image labeling process. In an example, the previously stored parameters may be computed from a set of training data that is relevant to the value of the global parameter.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a human pose identification system, the system described is provided as an example and not a limitation. As those skilled in the art will appreciate, the present examples are suitable for application in a variety of different types of image labeling systems.

The techniques below are described with reference to images, which can be two or three dimensional images or a sequence of such images. The images may be two dimensional or higher dimensional volumetric images representing the (or a sequence of such images). Volumetric images and are formed of voxels. A voxel in a three dimensional volumetric image is analogous to a pixel in a two dimensional image and represents a unit of volume.

Figure 1:
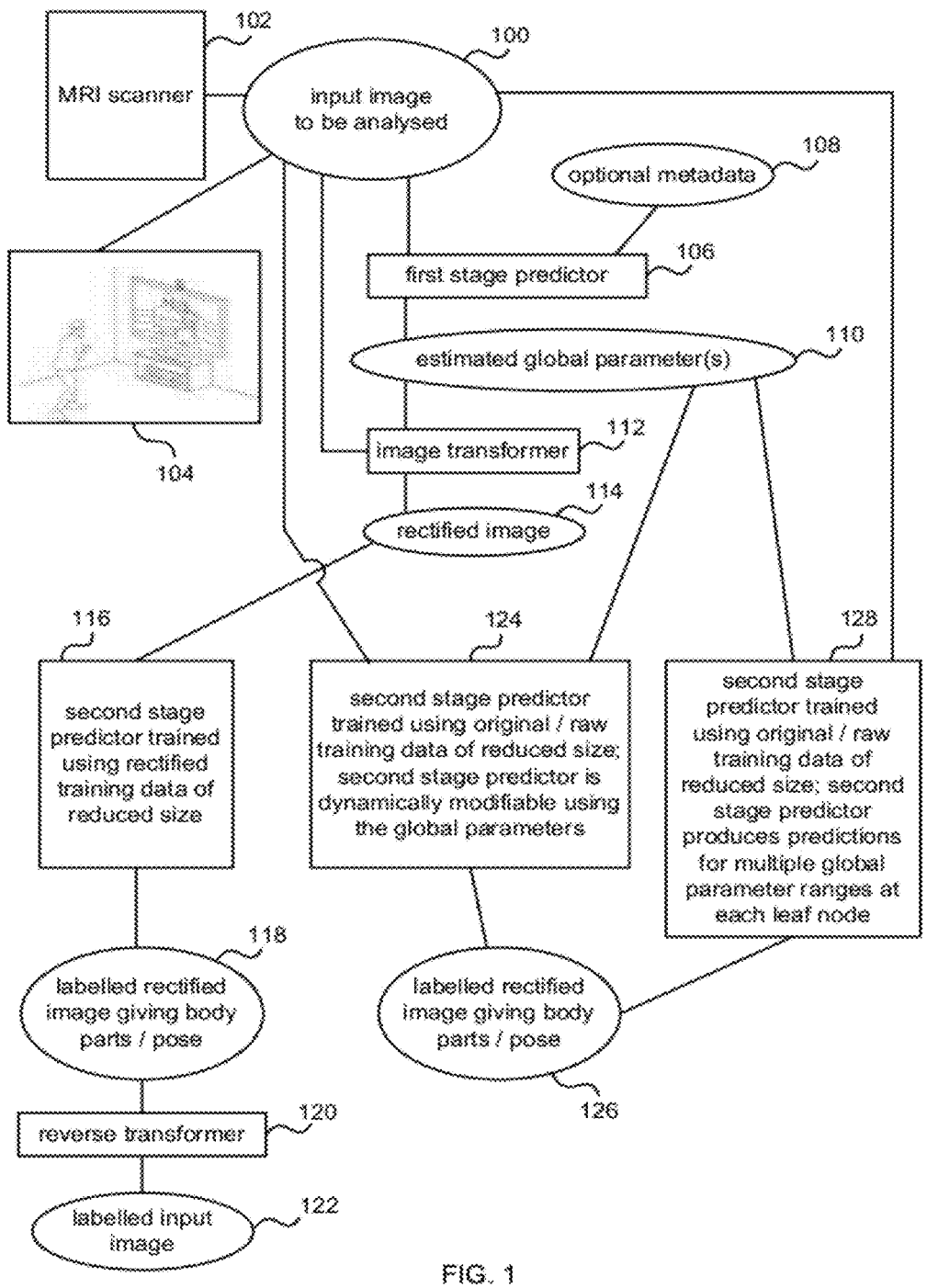
FIG. 1 is a schematic diagram of an example system for image labeling in the case of human or animal pose estimation.

FIG. 1 is a schematic diagram of an image labeling system comprising a computer implemented image labeling system. The image labeling system is arranged to output labeling for human or animal body parts or parts of other objects based on an input image. Image labeling is used in a variety of applications but can be computationally challenging. Large variations in body type of image subjects and the large range of poses of the human body can be captured and can lead to inaccuracies in body part labeling.

In an example the image labeling system is arranged to receive an image 100, which may be of two or higher dimensions and may be a depth image, a color video image, a medical image, a 3D object representation, such as a 3D scan, for example a 3D structured light scan or other type of image. The image may be received, for example, from a magnetic resonance imaging (MRI) scanner or other medical imaging device 102 or from a depth camera or other tracking device associated with a gaming system 104. In an example the image labeling system may be a pose estimation system which is arranged to provide estimates for subject poses from an input image.

In an embodiment where body part labeling is used in a medical imaging system different organs can be labeled, for example, the liver, left lung, right lung etc. However organs may vary in shape from one subject to another. Even when multiple images of the same subject are compared the organs may appear differently due to being stretched or compressed by different poses of the subject.

In another embodiment, where body part labeling is used in a system to allow hands free control of a gaming system, for example to influence the course of a game using estimated poses, joint positions or labels. The system may be able to recognize body parts of players of a plurality of different shapes and sizes. The system may also be able to label body parts of a player and interpret gesture input even though poses may differ from one player to another or from one play of a game to another when a player uses the system on multiple occasions. For example a gaming system 104 may receive an input from a camera e.g. a depth camera while a user is playing a boxing game. The gaming system may label the positions of the user's hands, feet, torso, head, or estimate joint positions or poses etc.

In order to interpret the input images and label body parts, the system is first trained on a large set of training data. The training data comprises images which have been labeled by a human or automated process. Training can be very time consuming and the training set cannot be exhaustive therefore errors and inaccuracies in the labeling may occur due to different poses or unusual variations in pose or size of players when compared to the training set.

To reduce the amount of image data in the training set and to improve accuracy of the system a first stage predictor 106 can be used to estimate at least one global parameter of the image 100. The global parameter describes image level features of an image or a part of an image, for example, in an image containing more than one person a different global parameter may be associated with each person as opposed to pixel or voxel level features.

The term 'predictor' is used herein to refer to a decision forest comprising root nodes, split nodes and leaf nodes, which has been trained to predict at least one global parameter for the received image. The decision forest may be a classification forest or a regression forest. In other embodiments the predictor may be a vector machine, for example: a support vector machine (SVM); or a relevance vector machine (RVM), in addition adaptive boosting techniques (ADA-boosting) may be used.

Estimating at least one global parameter allows variations between input images to be reduced. A non-exhaustive list of examples of global parameters is: height of a human or animal body, weight of a human or animal body, waist size of a human or animal body, in-plane rotation of a human or animal (that is rotation of a human or animal in the plane of the image, such as when a player leans to one side), out of plane rotation (that is rotation of a human or animal out of the plane of the image such as when a player turns sideways as if ready to strike a golf ball), game context actions such as shooting or dribbling a ball in a basket ball game, swinging or changing a driver in a golf game, 3D object rotation, age, limb proportions, gender, clothing. The first stage predictor receives the image and may also receive optional metadata 108. The metadata may provide additional information regarding context in which the image was received. For example, in an embodiment where an image of a user playing a golfing game or a ten-pin bowling game is received from a depth camera additional information about the expected position of a subject may be received. In another example where an image is received from a medical imaging device the information may be, for example, if the subject is in an upright or prone position.

The first stage predictor is arranged to predict one or more parameters of an image. In an example the parameters may be global parameters, for example, height, weight, out of plane or in-plane rotation. For example the first stage predictor 106 may be arranged to predict the height of a user in a received image. The one or more estimated global parameters 110 can be output by the first stage predictor. In an example the one or more estimated global parameters can be used to modify the image labeling process.

In an embodiment the one or more parameters can be used to rectify the input images to be invariant to a global parameter so that the images are at a standard scale. For example, in the embodiment where input is received from a medical imaging device 102, it may be possible to rectifying the images so that variations in subject height or body mass are removed. In another example where input is received from a gaming device camera, the image may be rectified to correct for differences in subject height or in-plane rotation. The input images may be rectified for any appropriate global parameter.

The estimated global parameters 110 and the input image to be analyzed 100 are received by an image transformer 112 which is arranged to transform the input image into a rectified image 114. In an example the image transformer transforms the input image 100 by performing a co-ordinate transformation. In another example the co-ordinates can be translated. For example the input image can be transformed such that height variation or rotation is removed.

The rectified image 114 can be received by a second stage predictor 116 which has been trained using training data rectified using the same global parameter as estimated by the first stage predictor. Because the training data is rectified, fewer example images need to be included in the training set. Rectifying the input data in order to remove global variations, for example height or weight of users, allows the second stage predictor to be trained more rapidly using a reduced set of training data. The second stage can be made to even predict human body poses more accurately by using a set of training data of the same size but which only contains images that have the canonical values of the global parameters, for example height and width of the human in the pose estimation application.

Overall the amount of training data used to train a first stage predictor to remove global parameters so that the images can be rectified and to train a second stage predictor to carry out an image labeling may be less than if a combined training set was used to train a single predictor to label images in the same manner.

The second stage predictor (which may use classification or regression) is arranged to label rectified images 118 to identify body parts or pose or for other applications. In an example the parts may be defined to directly localize particular skeletal joints of interest. In another example parts may be used in combination to predict joints. In an example the predictor may label body parts as left/right/upper/lower, a non-exhaustive list of examples is; left upper torso, right lower torso, left wrist, right knee, left kidney, right kidney. However, the choice of body part labeling is dependent on the application and any appropriate number of body part labels may be used. For example in an upper body tracking scenario, all lower body parts could be merged. In an example parts may be sufficiently small to accurately localize body parts which are needed by an application but not too numerous as to waste model capacity of the predictor. Where the image is an image of the whole body an example of an appropriate number of body parts is 31. However any appropriate number may be used.

The labeled rectified image 118 may be input into a reverse transformer 120 and transformed into a labeled version of the original input image 122. For example the labeled image may be transformed back into the original image scale, rotation, or frame of reference. However, this is not essential and the output of the image labeling system may be in the form of a rectified image.

In another embodiment modifying the image labeling process comprises modifying at least one stored parameter of the image labeling process. In an example an input image to be analyzed 100 and the estimated global parameters 110 from the first stage predictor can be input into a second stage predictor 124 trained using a reduced set of un-rectified training data. The second stage predictor 124 may be arranged so that it can be dynamically modified using the estimated global parameters 110 output from the first stage predictor 106. Dynamic modification of the second stage predictor 124 allows the input image to be adaptively modified to compensate for the estimated global parameter and a labeled output image 126 to be output directly for an input image without first rectifying the image. For example, the input image or the image features may be dynamically scaled such that one or more body parts can be identified.

In a further embodiment the input image 100 can be analyzed 100 and the estimated global parameters 110 from the first stage predictor can be input into a second stage predictor 128 trained using a reduced set of un-rectified training data. In this embodiment the second stage predictor is trained to identify at least one further parameter. For example the second stage predictor 128 may be trained on a first set of training data to estimate out of plane global parameters 110 such as rotation. The second stage predictor may also be trained to predict local parameters, for example joint predictions. In an example, the second stage predictor may be a decision forest comprising a plurality of decision trees, each tree having a root node, a plurality of split nodes and a plurality of leaf nodes. The second stage predictor may store a plurality of distributions at leaf nodes. In an example an input image may first be rotated by a relevant amount and then the features may be dynamically scaled such that one or more body parts may be identified and a labeled version of the input image 126 giving body parts and pose can be output. The stored distributions at the leaf nodes of the predictors may be discrete distributions or may be continuous.

In an embodiment at least one image (which may be a single image or a video or image sequence) is received at the image labeling system and at least one global parameter 110 is computed for the input image. Computing the global parameter comprises selecting at least a subset of image elements in the image and determining the probability that the image element depicts an object having a specified global parameter and combining the probability from a plurality of the selected image elements to compute an estimate of the global parameter as is described in more detail herein below. The term 'image element' is used herein to refer to either a pixel in a two dimensional image or voxel in a three dimensional image or to groups of pixels or voxels such as patches or blobs. Each image element has a value that represents a property such as intensity or color. The property can depend on the type of imaging device generating the image. In an example the image intensities can be related to the density of the tissue at a given portion of the image. The image labeling process is modified according to the estimated global parameter. In an embodiment modifying the image labeling process comprises rectifying the at least one input image. This may be executed at the image transformer 112 as described above. In another embodiment modifying the image labeling process comprises modifying at least one stored parameter of the image labeling process, for example adaptively modifying 124, the predictor as described above.

Figure 2A:
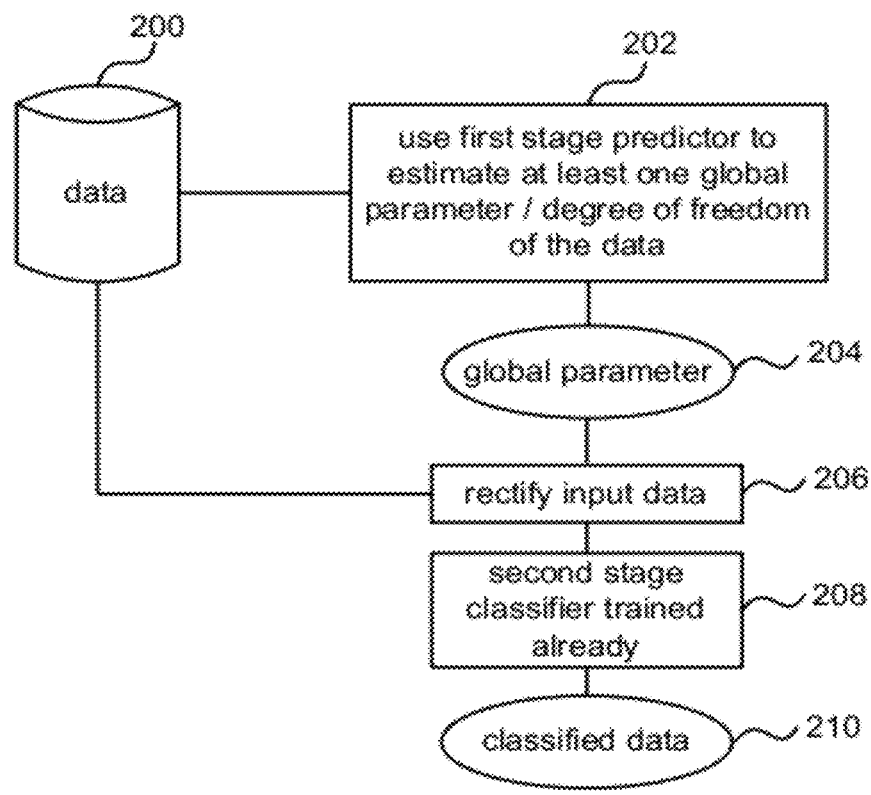
FIG. 2A is a schematic diagram of an example method of image labeling by rectifying for a global parameter.

FIG. 2A is a schematic diagram of an example method of image labeling, such as for predicting human pose data by rectifying for an in plane global parameter. In an embodiment a first stage (first stage) predictor 202 is arranged to receive data 200.

In an example the data 200 is a medical volumetric image. In other examples other types of input data may be used. For example data from a depth camera. The first stage predictor may be trained using a training set of rectified data. Training of predictors is described in more detail herein below. The predictor estimates at least one global parameter 204 or degree of freedom, for example height or waist size and the input data can be rectified 206 to remove this parameter. The rectified data is input into a trained second stage predictor 208 which outputs classified data 210. In an example the second stage predictor 208 may be trained to identify and label organs or other anatomical structures.

For example a computed tomography (CT) or other volumetric medical image may be received at the first predictor which outputs an estimate of at least one global parameter e.g. the in plane angle of the subject in a 2D image or the orientation of the head-foot axis in a 3D image. An image can be output which is rectified to a canonical angle. The rectified image can be input to the second stage predictor which is trained to label organs e.g. kidney, liver, lung.

In another example the data 200 may be a whole body image of a person or persons received from a depth camera and a body part distribution may be inferred from the rectified data so that in the classified data 210 each image element is assigned to a body part label. As in the previous example the predictor can be trained using an appropriate set of training data.

Figure 2B:
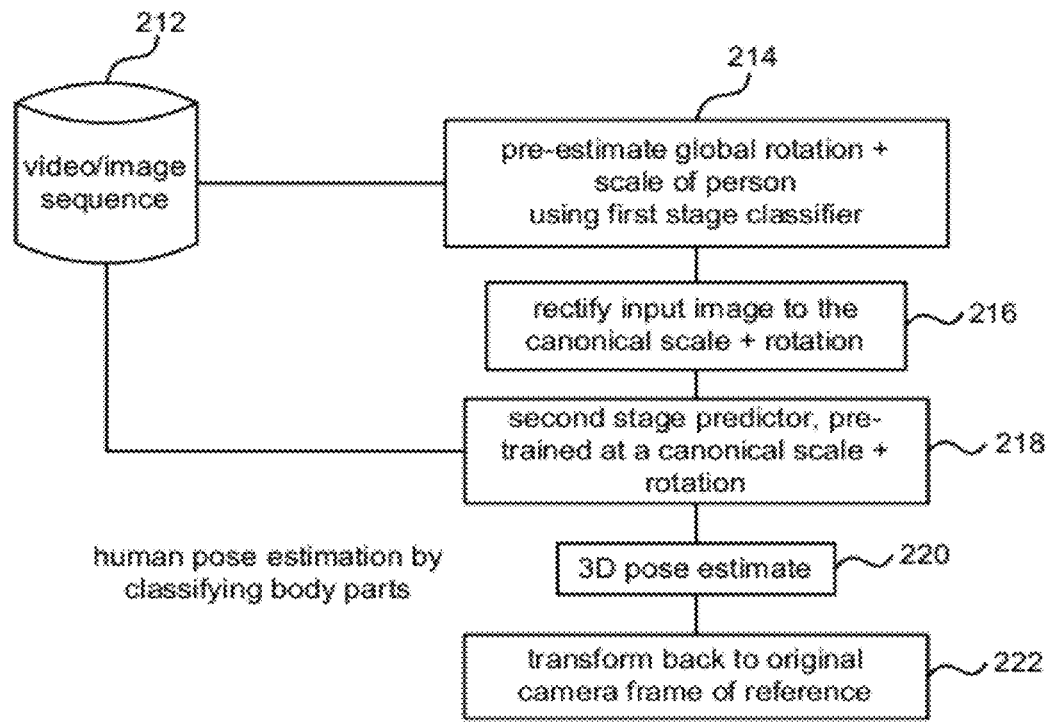
FIG. 2B is a schematic diagram of an example method of image labeling by rectifying for in plane and rotational parameters.

FIG. 2B is a schematic diagram of an example method of image labeling such as for predicting human or animal pose data by rectifying for both in plane and out of plane parameters. In an example a video or image sequence 212 is received by a first stage predictor 214. The first stage predictor is trained to estimate both in plane and out of plane global parameters and rectify 216 the input data to a canonical scale. In an example the canonical scale of the data is the maximum or minimum of a specified global parameter of the image data, for example the maximum or minimum height in any image in the sequence. In another example the canonical scale is an average of the global parameter across the image sequence. In another example the canonical scale can be pre-set, for example the scale can be preset by a user or an automated process.

The rectified data can be input into a second stage predictor 218 which has been pre-trained at a canonical scale. In an embodiment a plurality of second stage trees predictors can be used each trained on a different discrete angle region in order to account for out of plane rotation. The second stage predictor is arranged to obtain a three dimensional pose estimate 220. The three dimensional pose estimate may optionally be transformed 220 back to the original camera frame of reference.

Figure 3:
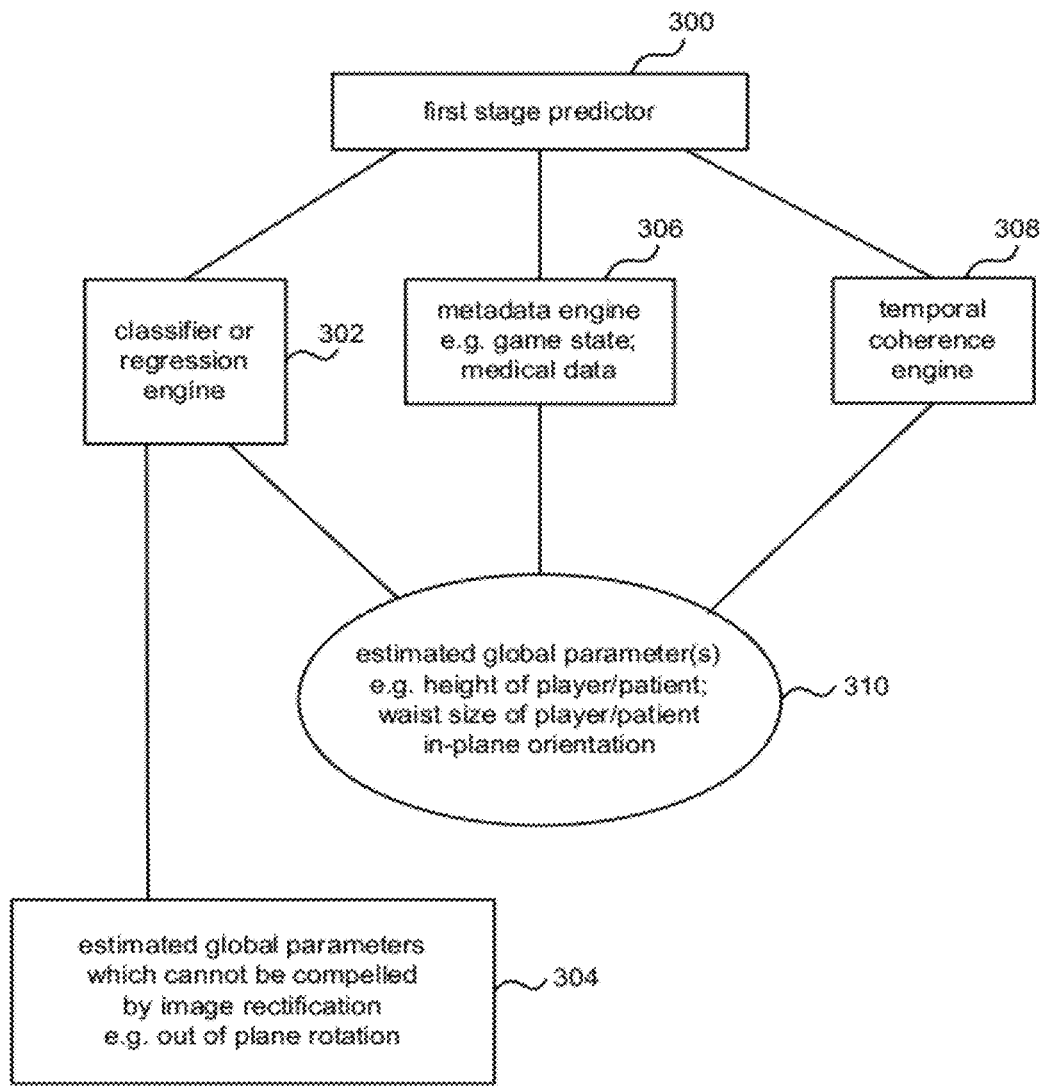
FIG. 3 is a schematic diagram of an image labeling system comprising a first stage predictor and a plurality of engines.

FIG. 3 is a schematic of an image labeling system comprising a first stage predictor and a plurality of engines. In an example the output from a first stage predictor 300 may comprise one or more estimates for a global parameter. To improve the accuracy of the global parameter prediction additional information may be used. In an example an additional classifier or regression engine 302 can be arranged to estimate additional global parameters 304 which cannot be computed in a first pass through the first stage predictor. In an embodiment the additional classifier or regression engine 302 can be a separate predictor. In another embodiment the classifier or regression engine 302 may be the same predictor with multiple parameters stored at the nodes.

A metadata engine 306 may be arranged to compute additional metadata which can be used to improve the global parameter estimation. In an example, as described above, where a game state is known, the metadata engine may identify additional information which may be used to compute the subject pose, for example, a subject using a golfing game or a bowling game may be more likely to be using a particular stance or have a particular rotation relative to the camera. In another example metadata may be provided to the system either manually or by an automated process, for example, where the input is a medical image a doctor, radiologist, technician or other user may input statistics, e.g. the height or weight of the image subject into the system.

In an example global parameters estimated for one image in an image sequence may be unlikely to change over the whole of the image sequence. For example although a user may change pose or position when playing a game, their total height will not change. A temporal coherence engine 308 may be arranged to estimate global parameters so that information in an image sequence may be passed from one image to the next, for example as a posterior distribution. In another example users may create a profile and parameters unique to the user determined using, for example facial recognition, body size recognition or clothing recognition can be stored to the user profile and may be reloaded automatically on demand, for example when the user profile is activated.

One or more of the regression engine 302, metadata engine 306 or temporal coherence engine 308 may enable improved estimates 310 of in-plane and/or out of plane global parameters.

Figure 4:
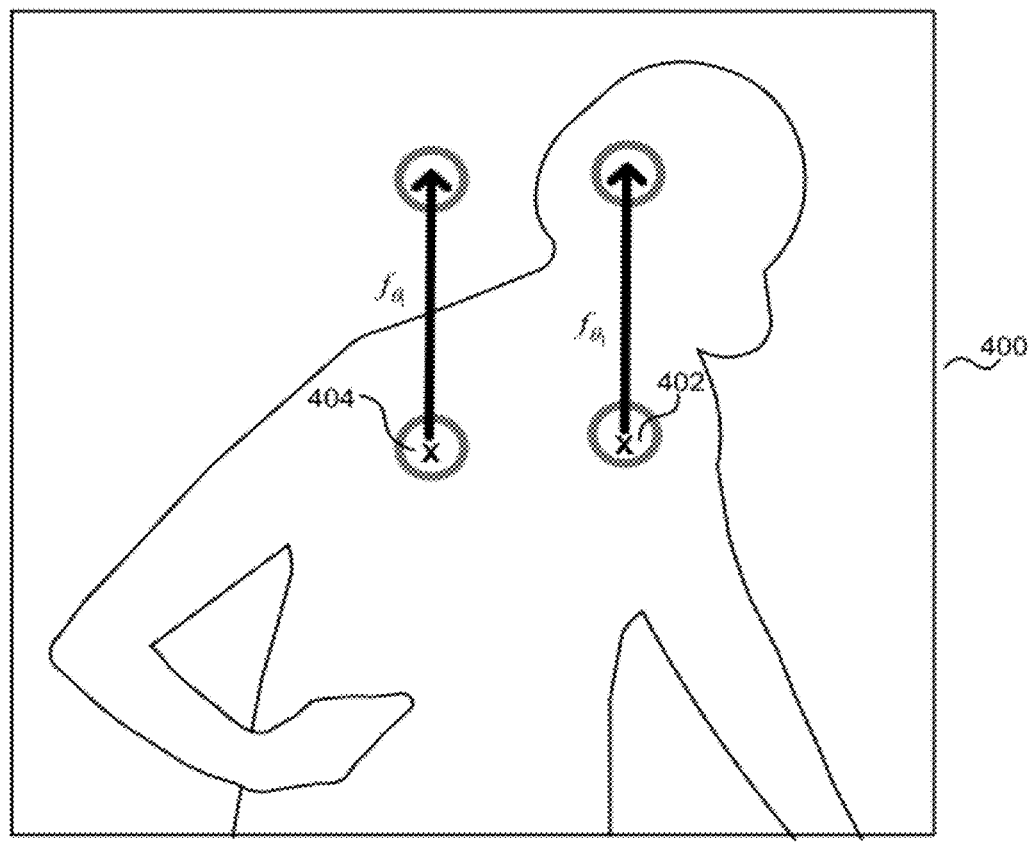
FIG. 4 is an example of computing depth comparison features at different image locations.

FIG. 4 is an example of computing depth comparison features at different image locations. Depth comparison features can be used to compute parameters of a depth image 400 using a predictor as described above. In an example, at a given pixel x 402, 404 the features can be computed as;

$$f_\theta(I, x) = d_I\left(x + \frac{u}{d_I(x)}\right) - d_I\left(x + \frac{v}{d_I(x)}\right) \quad (1)$$

where $d_I(x)$ is the depth at pixel x in image I and parameters $\theta=(u, v)$ describe offsets u and v. The features can be normalized by $$\frac{1}{d_I(x)}$$

to ensure they are depth invariant; at a given point on a body, a fixed world-space offset will result whether the pixel is close or far from the camera. The features are 3D translation invariant. If an offset pixel lies on the background the depth probe $d_I(x')$ is given a large positive constant value.

In an example where the second stage predictor is adaptively modified the features can be computed to incorporate the global parameters. For example, to adaptively modify for height h, equation 1 may become;

$$f_\theta(I, x) = d_I\left(x + \frac{u}{d_I(x) \times h}\right) - d_I\left(x + \frac{v}{d_I(x) \times h}\right)$$

To adaptively modify for in-plane rotation the vectors u and v may be pre-rotated using a standard rotation matrix.

FIG. 4 illustrates an example feature test at different image element locations 402 and 404. At location 404 feature test $f_{\theta_1}$ gives a large positive response. At location 402 this feature test gives a response close to zero. Individually these features provide only a weak signal but, in an example, the information from a plurality of features may be aggregated to give an increased signal. For example feature test $f_{\theta_1}$ 404 may be used to estimate a global parameter such as height.

Figure 5:
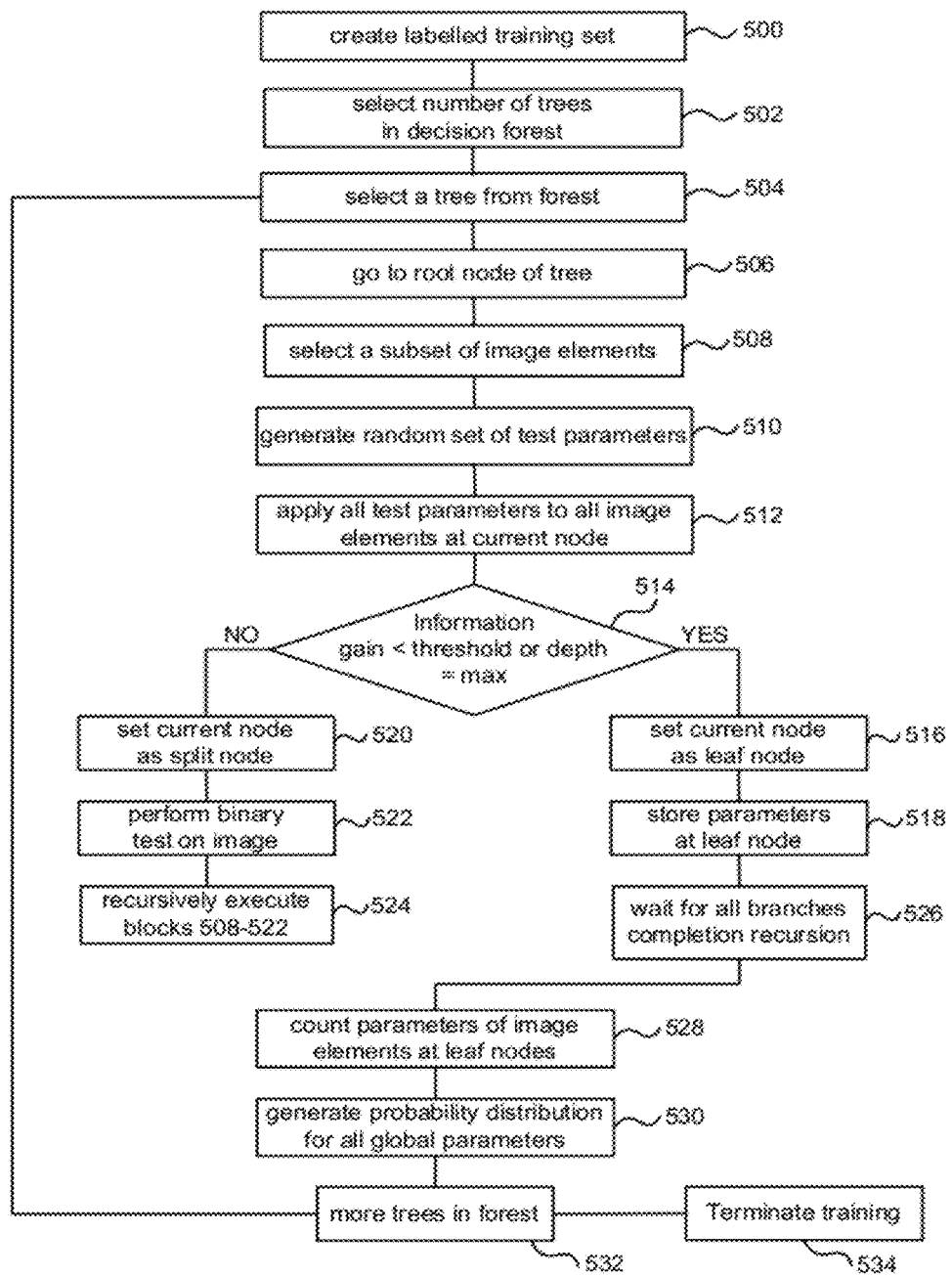
FIG. 5 is a flow diagram of an example method of training a first stage predictor.

In an embodiment image labels such as for pose estimates can be computed using a forest of trained decision trees. FIG. 5 is an example flow diagram of training a first-stage predictor to predict global parameters as described above. A labeled ground-truth training set is created 500. In example a large database of motion capture images of human beings in a wide range of poses can be used as a training set. Random variation can be automatically added to the data to give wide coverage of height, weight, orientation and different body shapes. A non-exhaustive list of other randomized parameters that may be included is; camera pose, camera noise, clothing and hairstyle. In an embodiment where the global parameter estimation is desired the predictor is trained using un-rectified training data.

The number of decision trees to be used in the decision forest is selected 502. The forest is composed of T trees denoted $\Psi_1, \ldots, \Psi_t, \ldots, \Psi_T$ with t indexing each tree. During the training process the number of trees is fixed. In an example the number of trees is three but other values may also be used. All trees may be trained in parallel or separately.

At each tree in the forest the root node is selected 506. All image elements from each of the training images are then selected 508. In other examples only a subset of image elements may be selected. An image element in an image V is defined by its co-ordinates v=(x,y) (in examples where the image V is a volumetric image v=(x,y,z).

A random set of test parameters are generated 510 for use by a binary test performed at the root node 506. In one example the binary test is of the form: $f_\theta(I,x)>\tau$, such that $f_\theta(I,x)$ is a function applied to image element v with parameters $\theta$ and with the output of the function compared to threshold value $\tau$. In some examples an upper and lower threshold value may be used. If the result of $f_\theta(I,x)$ is greater than $\tau$ then the result of the binary test is true, otherwise the result of the binary test is false. In the example described here, $f_\theta(I,x)$ is an image feature as described above with reference to FIG. 4, the parameter $\theta$ defines a visual feature of the image. For example, as described below the parameter $\theta$ may describe an offset.

The process for generating the parameters $\theta$ comprises generating, for example, a plurality of features and a spatial offset value. The spatial offset value is in the form of a two- or three-dimensional displacement. In other examples, the parameters $\theta$ can further comprise one or more additional randomly generated spatial offset values.

The result of the binary test performed at the root node or split node determines which child node an image element is passed to. For example if the result of the binary test is true, the image element is passed to a first child node, whereas if the result is false, the image element is passed to a second child node. In an example the subset of image elements $Q_s(I, x)$ can be divided into the image elements passed to the left node which may be defined as $Q_l(\phi)=\{(I,x)|f_\theta(I,x)<\tau\}$ and the subset of elements passed to the right node which may be defined as $Q_r(\phi)=Q/Q_l(\phi)$ or vice versa, where $\phi=(\theta, \tau)$ is the set of splitting candidates.

The random set of test parameters generated comprise a plurality of random values for the function parameters $\theta$ and the threshold parameter value $\tau$. In order to inject randomness into the decision trees, the function parameters $\theta$ of each split node are optimized over only a randomly sampled subset $\Theta$ of all possible parameters. For example, the size of the subset can be 100. This is an effective way of increasing generalization.

Every combination of test parameter is applied 512 to each image element in the training images. In other words, all available values $\theta \in \Theta$ are tried one after another, in combination with all available values of $\tau$ for each image element in each training image. For each combination, the information gain, also known as the relative entropy may be calculated by selecting parameters maximizing information given. In an embodiment the information gain function is optimized by selecting appropriate parameters at each node. For example the information gain can be computed from as $$\phi^* = \underset{\phi}{\mathrm{argmax}}\, G(\phi) \text{ where;}$$

$$G(\phi) = E(q) - \sum_{s \in \{l,r\}} \frac{|Q_s(\phi)|}{|Q|} E(Q_s(\phi)).$$

In an example the entropy $E(Q)$ is a Shannon entropy. The entropy $E(Q)$ may be computed from a normalized histogram of the parameter labels $1_f(x)$ for all $(I,x) \in Q$. In some embodiments the entropy can be computed over both global and local parameters. As an alternative to information gain other criteria can be used, such as Gini entropy or 'two-ing' criterion.

In some embodiments, if the value for the maximized information is less than a fixed threshold 514 then this indicates that the further expansion of the tree will not provide significant benefit. In other examples the node stops growing when a maximum tree depth is reached or too few points reach the node. In an example the maximum depth of the trees is 20 levels, although other values can be used. In an example the maximum depth of the trees is chosen to minimize the mean error. Where further nodes will not provide significant benefit the node is set as a leaf node 516. At each leaf node the predictions for the parameters are stored 518. This gives rise to asymmetrical trees which naturally stop growing when no further nodes are needed.

If the value for the maximized information gain is greater than or equal to the threshold and the tree depth is less than the maximum value then the current node is set as a split node 520. As the current node is a split node it has child nodes and the process moves to training these child nodes. Each child node is trained using a subset of the training image elements at the current node. The subset of image elements sent to a child node is determined using the parameters $\Theta^*$ and $\tau^*$ that maximized the information gain. These parameters are used in the binary test and the binary test performed 522 on all image elements at the current node. The image elements that pass the binary test form a first subset sent to a first child node and the image elements that fail the binary test form a second subset sent to a second child node. After training the $j^{th}$ split node remains associated with the feature $\theta_j$ and the threshold $\tau_j$.

For each of the child nodes, the process as outlined in blocks 508-522 of FIG. 5 is recursively executed 524 for the subset of image elements directed to the respective child node. In other words, for each child node, new random test parameters are generated 510, applied 512 to the respective subset of image elements directed to the respective child node, parameters maximizing the information gain are selected, and the type of node (split or leaf) determined. If it is a leaf node then the current branch of recursion ceased. If it is a split node, binary tests 522 are performed to determine further subsets of image elements and another branch of recursion starts. Therefore this process recursively moves through the tree, training each node until leaf nodes are reached at each branch. As leaf nodes are reached the process waits 526 until all the nodes in all the branches have been trained. In other examples the same functionality can be attained using alternative techniques to recursion. For example, iteration or breadth first training.

Once all the nodes in the tree have been trained to determine the parameters for the binary test maximizing the information gain at each split node, and leaf nodes have been selected to terminate each branch, then probability distributions for global parameters can be determined for all the leaf nodes of the tree.

In an embodiment where the decision forest is a classification forest comprising a plurality of classification trees the probability distributions for global parameters can be determined by counting 528 the global parameter estimates of the training image elements that reach each of the leaf nodes. All the image elements from all of the training images end up at a leaf node of the tree. Each image element of the training images has an estimated global parameter associated with it. A total number of image elements which vote for each global parameter value can be counted at each leaf node. A probability distribution for the global parameter estimates at that leaf node can be generated 530. To generate a distribution, the histogram can be normalized. Optionally, a small prior count can be added to all global parameter values so that no class is assigned zero probability, which can improve generalization.

In an example where the decision forest is a classification forest the entropy is measured over discrete class labels. In contrast, in an example where the decision forest is a regression forest comprising a plurality of regression trees the purity of the probability density of the real valued predictions is measured. For a single class c the distribution can be modeled at each node, for example as a multivariate Gaussian.

If more trees are to be trained 532 the process repeats for the remaining trees. Once the leaf nodes have been reached for all trees in the forest the training process is complete and the process terminated 534.

Figure 6:
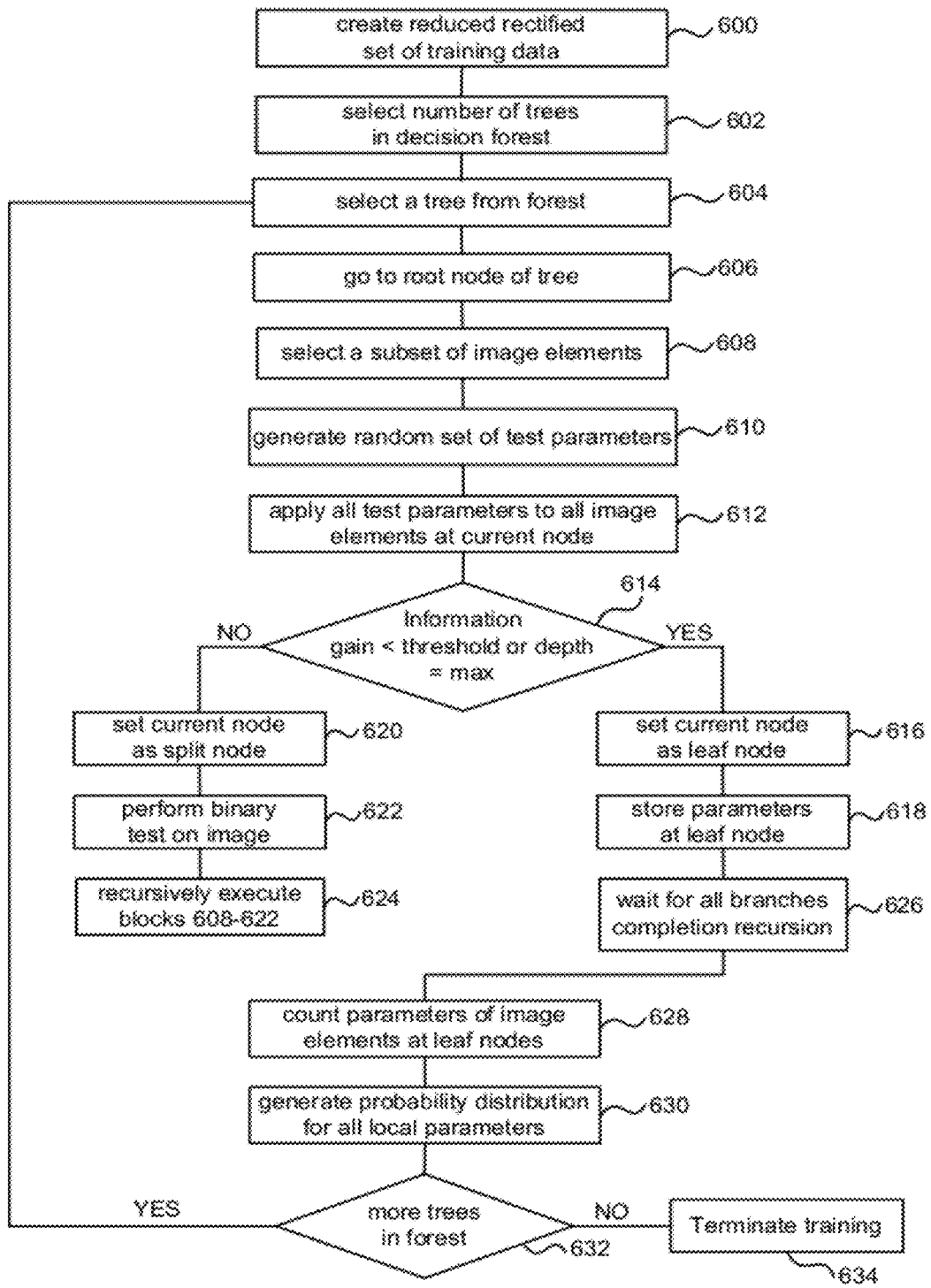
FIG. 6 in a flow diagram of an example method of training a second stage predictor.

FIG. 6 is a flow diagram of an example method of training a second stage predictor. A labeled ground-truth training set is created 600 from rectified data. The training set may be of reduced size compared to an embodiment where a first stage predictor is not used for global parameter estimation. For example where body part or pose labeling is desired the predictor is trained using training data which has been rectified to remove global variations, e.g. height, weight or rotation.

A second stage predictor is trained in a similar manner to a first-stage predictor, however a reduced, rectified data set is used. Blocks 502-528 of training a first stage predictor as shown in FIG. 5 are repeated in FIG. 6 and renumbered as 602-628, namely selecting a tree from the forest, going to the root node of the tree, selecting a subset of image elements, generating a random set of test parameters, applying the test parameters to image elements at the current node, computing the information gain and setting the current node as a split or leaf node as described above.

Once all the nodes in the tree have been trained to determine the parameters for the binary test maximizing the information gain at each split node, and leaf nodes have been selected to terminate each branch, then probability distributions for body part labels, or other appropriate parameters can be determined for all the leaf nodes of the tree. All the image elements from all of the training images end up at a leaf node of the tree. As each image element of the training images has a body part label associated with it, a total number of image elements in each class can be counted at each leaf node. From the number of image elements for each label at a leaf node and the total number of image elements at that leaf node, a probability distribution for the classes at that leaf node can be generated 630. As described above with reference to FIG. 5, the histogram can be normalized or optionally, a small prior count can be added to all global parameter values so that no class is assigned zero probability, which can improve generalization. If more trees are to be trained 632 the process repeats for the remaining trees. Once the leaf nodes have been reached for all trees in the forest the training process is complete and the process terminated 634.

Figure 7:
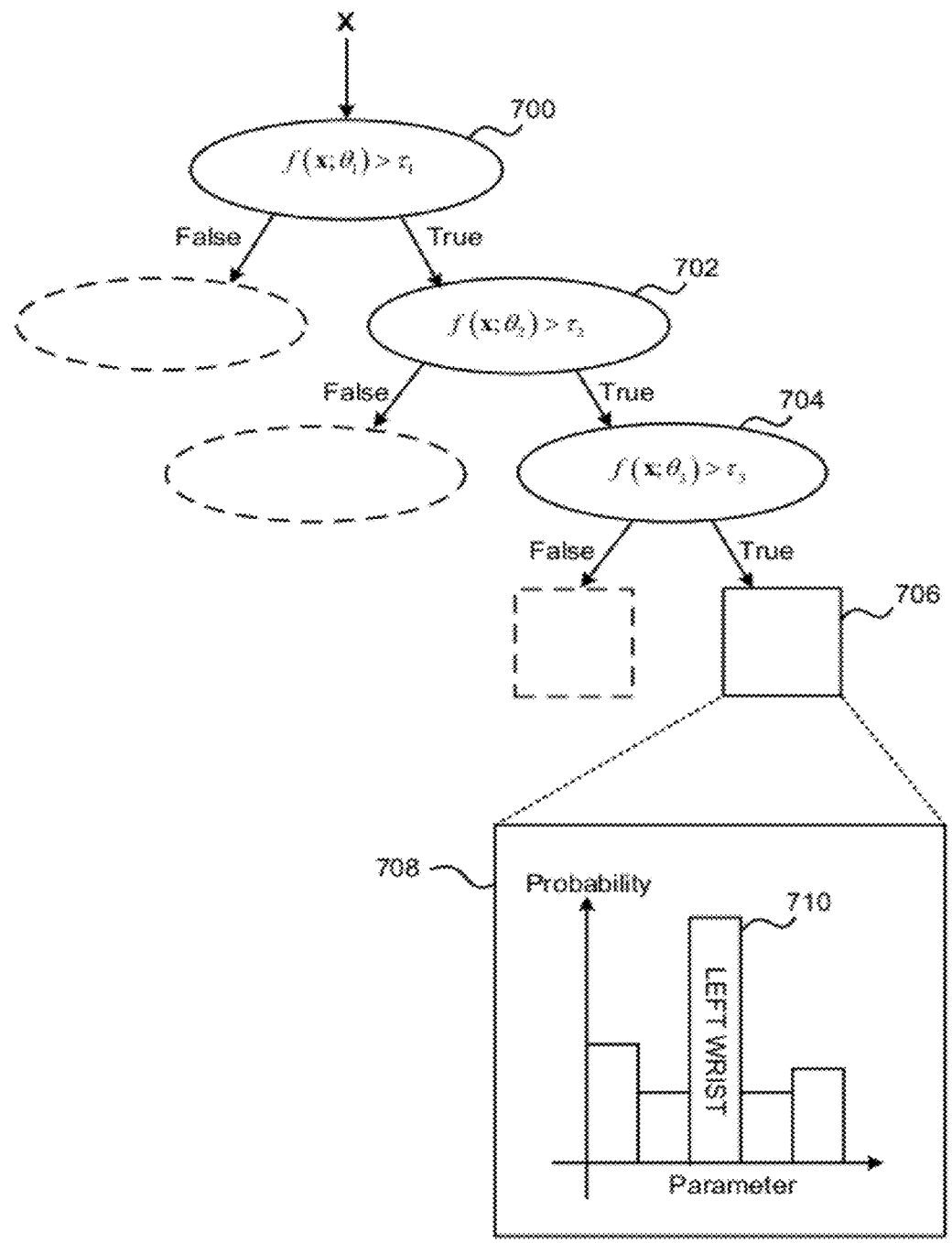
FIG. 7 is a illustrates a decision tree having 3 levels.

FIG. 7 is a schematic diagram of a decision tree having three levels. The training algorithm has selected the first set of parameters $\theta_1$ and threshold $\tau_1$ to be the test applied at a root node 700 of the decision tree of FIG. 7. As described above, the training algorithm selects this test as it had the maximum information gain for the training images. An image element x is applied to the root node 700, and the test performed on this image element. In an embodiment a reduced set of image element can be used to train the tree. For example the number of image elements required to train a first or second stage predictor may be the square root of the number of image elements required to train an image tree where no rectification is carried, therefore the overall training set required is reduced even in a two stage process.

When all the image elements from an image are applied to the trained decision tree of FIG. 7, the subset of image elements that pass the binary test are passed to child split node 702, and the subset of image elements that fail the binary test are passed to the other child node.

The training algorithm has selected the second set of parameters $\theta_2$ and threshold $\tau_2$ to be the test applied at the split node 702 and the testing process is repeated.

The training algorithm has selected the third set of parameters $\theta_3$ and threshold $\tau_3$ to be applied at the split node 704 and the process is repeated again. The image elements in this three-level intersection passing the test are provided to leaf node 706. At the leaf node 706, a learned distribution $P_t$(c|I, x) over parameter estimates is stored. In an example, as shown in FIG. 7 a discrete distribution stored at the leaf node for different body parts may indicates that the most likely body part is the left wrist.

In other words, the leaf nodes store the posterior probabilities over the parameters being trained. In an example predictor trained as described with reference to FIG. 5, the stored probability distributions may be for global parameters. In an example predictor trained as described with reference to FIG. 6 the stored probability distributions may be for local parameters, for example body part distributions. The stored probability distributions may be continuous or discrete. In an example the choice of continuous or discrete distributions may depend on the type of decision tree used.

Figure 8:
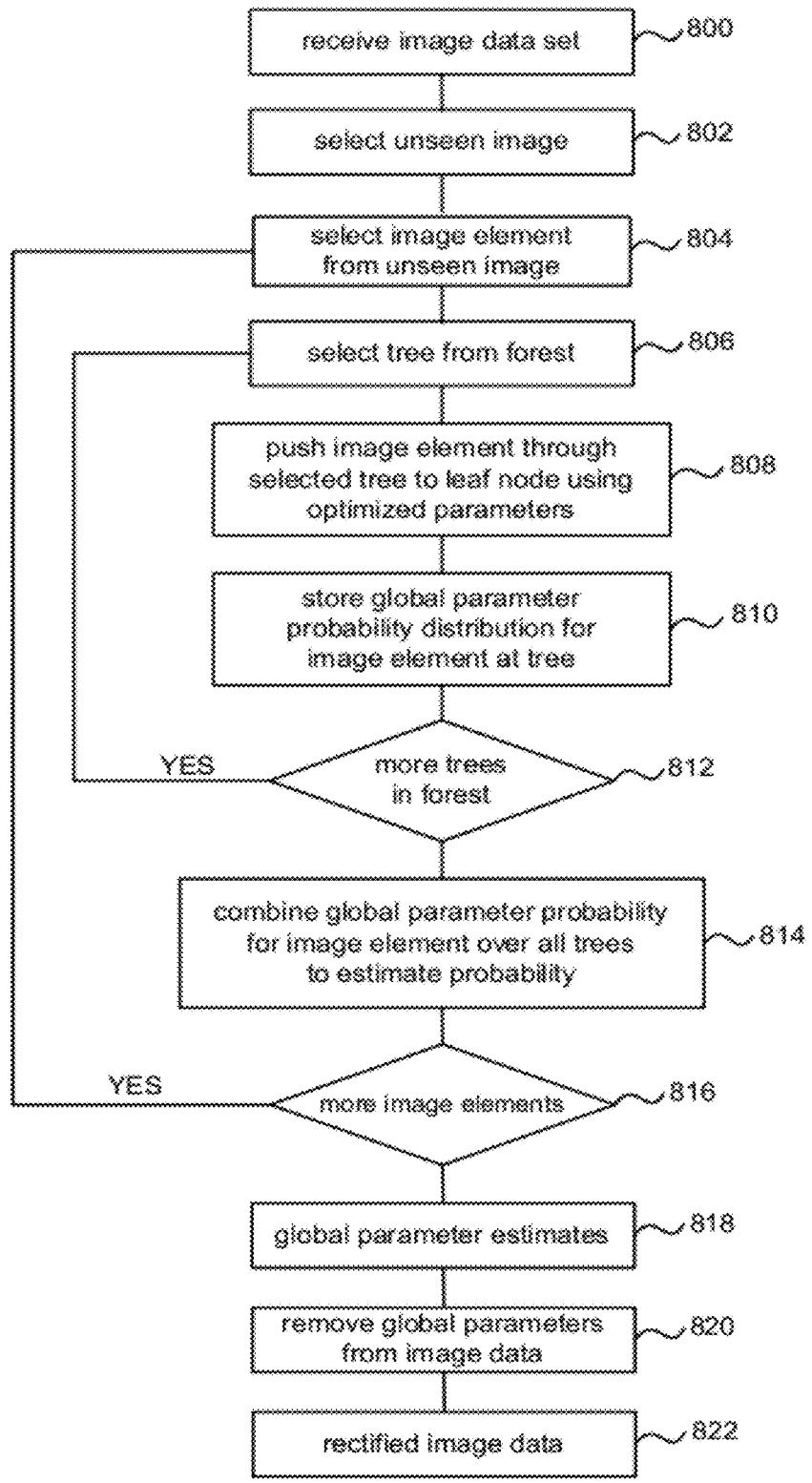
FIG. 8 is a flow diagram of an example method of producing a set of rectified training data.

FIG. 8 is a flow diagram of an example method of obtaining global parameter estimates and optionally of producing rectified image data using a trained predictor. In an embodiment the decision forest can be trained to estimate global parameters as described above with reference to FIG. 5. An image data set is received 800, the image data set may be a single image or an image sequence as described above. An unseen image is selected 802. An image is referred to as 'unseen' to distinguish it from a training image.

An image element from the unseen image is selected 804. A trained decision tree from the decision forest is also selected 806. The selected image element is pushed 808 through the selected decision tree, such that it is tested against the trained parameters at a node, and then passed to the appropriate child in dependence on the outcome of the test, and the process repeated until the image element reaches a leaf node. Once the image element reaches a leaf node, the global parameter probability distribution associated with this leaf node is stored 810 for this image element.

If it is determined 812 that there are more decision trees in the forest, then a new decision tree is selected 806, the image element pushed 808 through the tree and the probability distribution stored 810. This is repeated until it has been performed for all the decision trees in the forest. Note that the process for pushing an image element through the plurality of trees in the decision forest can also be performed in parallel, instead of in sequence as shown in FIG. 8.

Once the image element has been pushed through all the trees in the decision forest, then a plurality of global parameter probability distributions are stored for the image element (at least one from each tree). These probability distributions are then combined 814 to form an overall probability distribution for the image element. In an embodiment combining the probabilities from a plurality of image elements to compute an estimate of the parameter comprises aggregating the probabilities stored at the leaf nodes. In one example, the overall probability distribution is the mean of all the individual probability distributions from the T different decision trees. In an example this can be given by;

$$P(c \mid I, x) = \frac{1}{T} \sum_{t=1}^{T} P_t(c \mid I, x).$$

The probability distribution can therefore be used to determine the likelihood of an image element reaching that leaf node contributing to an estimated global parameter.

Note that methods of combining the tree posterior probabilities other than averaging can also be used, such as multiplying the probabilities. Optionally, an analysis of the variability between the individual probability distributions can be performed. Such an analysis can provide information about the uncertainty of the overall probability distribution. In one example, the standard deviation can be determined as a measure of the variability.

In another embodiment combining the probabilities from a plurality of selected image elements to compute an estimate of the parameter comprises using the stored probabilities from a subset of leaf nodes wherein the subset of leaf nodes c the most confident nodes in the forest. In an example, a set of leaves $\overline{L}$ can be selected. In an example $\overline{L}$ may be a subset of all forest leaves. For example $\overline{L}$ may be the set of leaves which has the smallest uncertainty (for each class c) and contain a specified threshold level of all test image elements. In an example the specified threshold level is 1%. However, another level may be used.

In the above example the most confident leaves are used to predict the output. For example $p(l)=1/|\Gamma|$ if $l \in \Gamma$, 0 otherwise, irrespective of where in the forest they come from.

If further unanalyzed image elements are present in the unseen image 816, another image element is selected and the process repeated. Once the overall probability distribution is determined, a global parameter of the image can be estimated 818. In one example, estimating a global parameter can be performed by determining the maximum probability in the overall probability distribution (i.e. $P_t=\max_x P_t(c|I, x)$). In other examples the mean probability or other appropriate estimator may be used. For example the mean of the probability distribution of an image subject height could be determined and used as a global parameter estimate. In some embodiments a per-tree aggregation as described above may not be carried out, or may be carried out simultaneously with a per-image or image region aggregation. In the examples described herein with reference to FIG. 8 and the examples below, the blocks of selecting another decision tree 812 and selecting another image element 816 may be performed interchangeably.

The global parameter estimates are output 818 by the first stage predictor. In an embodiment the global parameter variations can optionally be removed 820 from the input image data, for example by using an image transformer (reference) to produce a set of rectified image data 824 given the estimated global parameter(s). The rectified image data can be used as input to a second stage predictor in order to produce accurate body part labeling.

Figure 9:
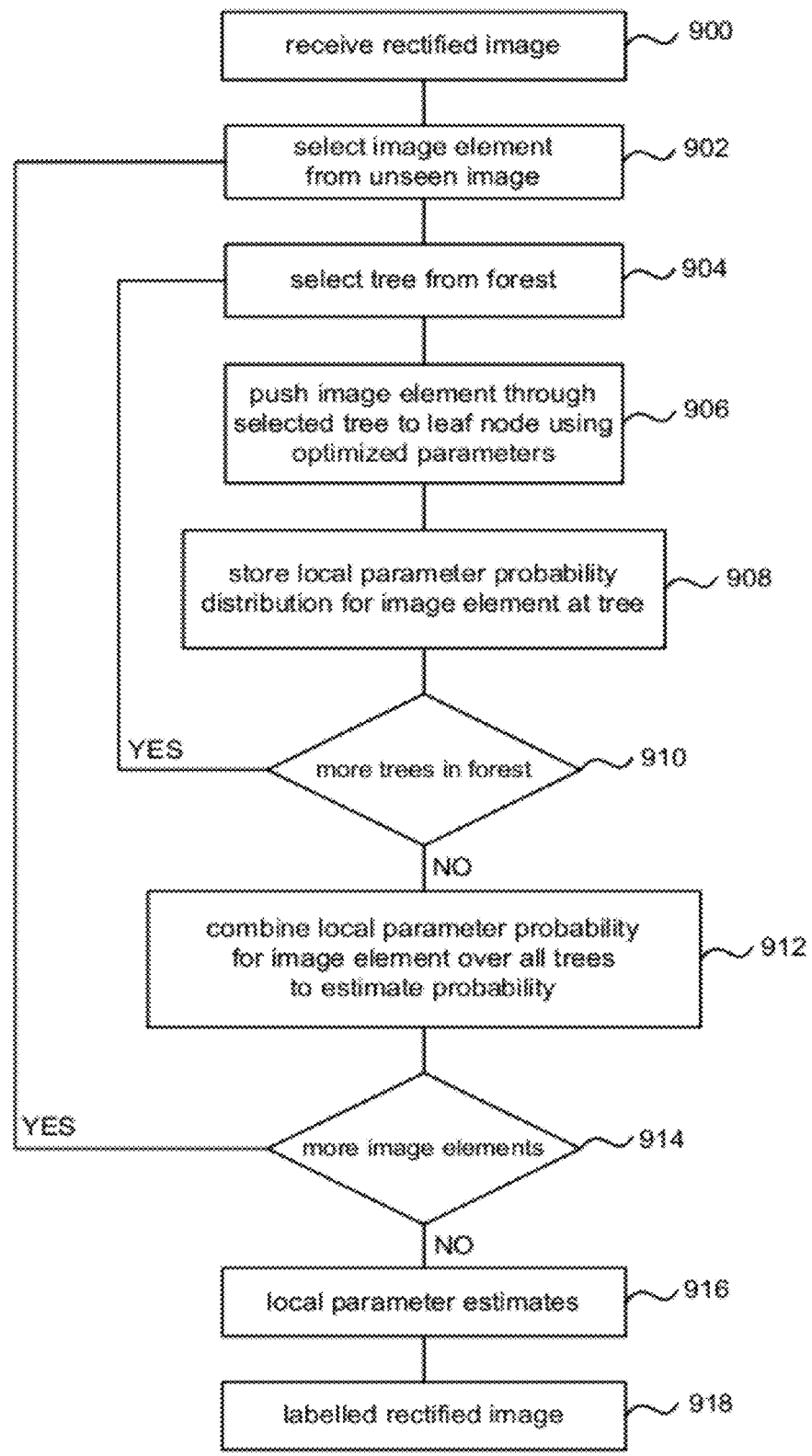
FIG. 9 is a flow diagram of an example method of labeling an image using a second stage predictor.

FIG. 9 is a flow diagram of an example method of labeling an image using a second stage predictor. In an example a rectified image is received 900. The image may have at least one global parameter rectified as described above with reference to FIG. 8. In another embodiment the image may have had a plurality of in-plane or out of plane global parameters removed. In a further embodiment where 3D data is used, for example 3D medical imaging data a combination of parameters, for example in-plane and 3D rotational parameters can be removed are removed. In an example, the method of labeling an image using a second stage predictor is similar to that described with reference to FIG. 8 for determining a global parameter. Blocks 902-906 duplicate the steps as described above with reference to blocks 804-808 of FIG. 8, namely selecting an image element and tree from the forest, pushing an image element through the tree to the leaf node using optimized parameters and through the selected decision tree, such that it is tested against the trained parameters at a node, and then passed to the appropriate child in dependence on the outcome of the test, and the process repeated until the image element reaches a leaf node.

The second stage predictor, has been trained (as described above with reference to FIG. 7) to estimate local parameters, for example body part labeling. Once the image element reaches a leaf node, the local parameter probability distribution associated with this leaf node is stored 908 for this image element (as opposed to a global parameter distribution for a first stage predictor as described above with reference to FIG. 8). In some embodiments the second stage predictor may be a tree structure which has previously been trained and is then re-purposed as described in more detail below.

If it is determined 910 that there are more decision trees in the forest, then a new decision tree is selected 904, the image element pushed 906 through the tree and the local parameter probability distribution stored 908. As described above this is repeated until it has been performed for all the decision trees in the forest.

Once the image element has been pushed through all the trees in the decision forest, then a plurality of local parameter probability distributions are stored for the image element (at least one from each tree). These probability distributions are then combined 912 to form an overall probability distribution for the image element. Examples of aggregation methods are described above with reference to block 814.

If further unanalyzed image elements are present 914 in the unseen image, another image element is selected and the process repeated. Once the overall probability distribution is determined, a local parameter of the image can be estimated 916. In one example, estimating a global parameter can be performed by determining the maximum probability in the overall probability distribution (i.e. $P_c=\max_x P_t(c|I, x)$).

In another embodiment a local mode-finding approach based on mean shift with a weighted Gaussian kernel can be used for local parameter estimation. In an embodiment where the input image is a depth image a density estimator per body part can be defined as;

$$f_c(\hat{x}) \propto \sum_{i=1}^{N} \omega_i \exp\left(-\left\|\frac{\hat{x}-\hat{x}_i}{b_c}\right\|^2\right)$$

where $\hat{x}$ is a coordinate in 3D world space, N is the number of image pixels, $\omega_i$ is a pixel weighting, $\hat{x}_i$ is the re-projection of image pixel $x_i$ into world space given depth $d_I(x_i)^2$ and $b_c$ is a learned per part bandwidth.

The pixel weighting $\omega_i$ comprises both the inferred parameter probability at the pixel and the world surface area of the pixel. For example the pixel weighting may be given by; $\omega_i=P(c|I, x_i) \times d_I(x_i)^2$ which ensures density estimates are depth invariant. In an embodiment where local parameter estimation is desired, the posterior $P(c|I, x_i)$ can-be pre-accumulated over a small set of image elements. For example, several localized body part labels may be defined, e.g. upper left torso, upper right torso, lower left torso, lower right torso and these may be merged localize the torso as a whole.

In another embodiment mean shift can be used to find modes in a density estimator. All pixels above a learned probability threshold $\lambda_c$ are used as starting points for a part c. A final confidence estimate can be given by the sum of the pixel weights reaching each mode. In some embodiments mean shift may be more reliable than taking the modal density estimate.

The detected modes lie on the surface of the body, each mode is therefore pushed back into the image scene by a learned z offset $\zeta_c$ to produce a final joint or body part position proposal. In an example, the bandwidth $b_c$, probability threshold $\lambda_c$ and surface to interior offset $\zeta_c$ are optimized per-part on a hold-out validation set.

In an example the output 918 can be a labeled version of the rectified image. Optionally the labeled rectified image can be transformed back, using the estimated global parameters, to a labeled version of the original input image.

Figure 10:
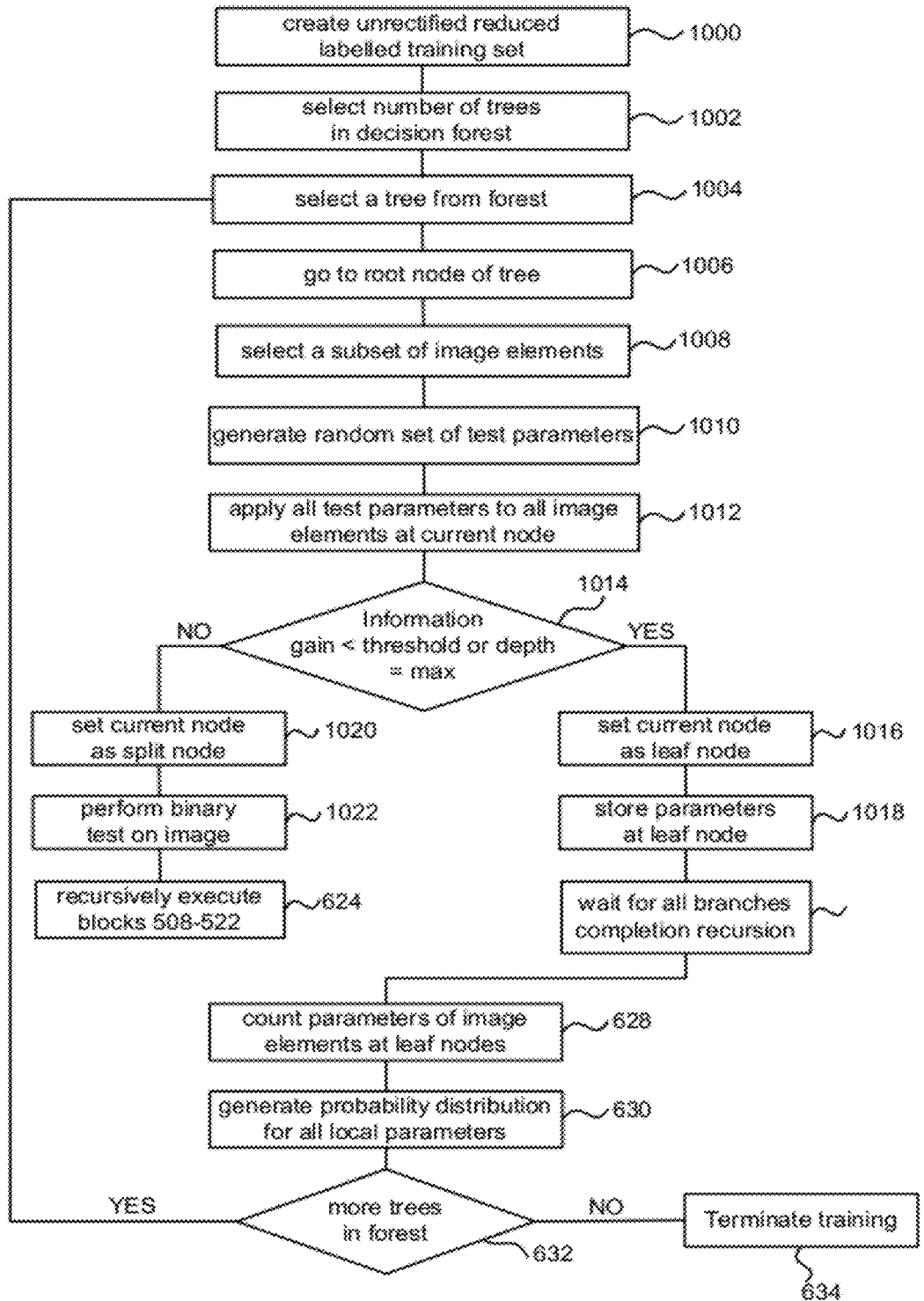
FIG. 10 is a flow diagram of an example method of training an adaptive second stage predictor.

FIG. 10 is a flow diagram of an example method of training an adaptive second stage predictor which has access to an estimated first stage result. In other examples a ground-truth global parameter value optionally distorted with random noise may be used. An adaptive second stage predictor is trained on a set of un-rectified training data, unlike the non-adaptive case as described above with reference to FIG. 6. A set of un-rectified ground truth training data is created 1000, as described above this data may be a large database of motion capture images of human beings in a wide range of poses can be used and to which random variation may be added. Once a set of un-rectified ground truth data has been created the adaptive second-stage predictor can be trained using the same method as described above for a non-adaptive predictor, with reference to blocks 602-632 of FIG. 6.

Figure 11:
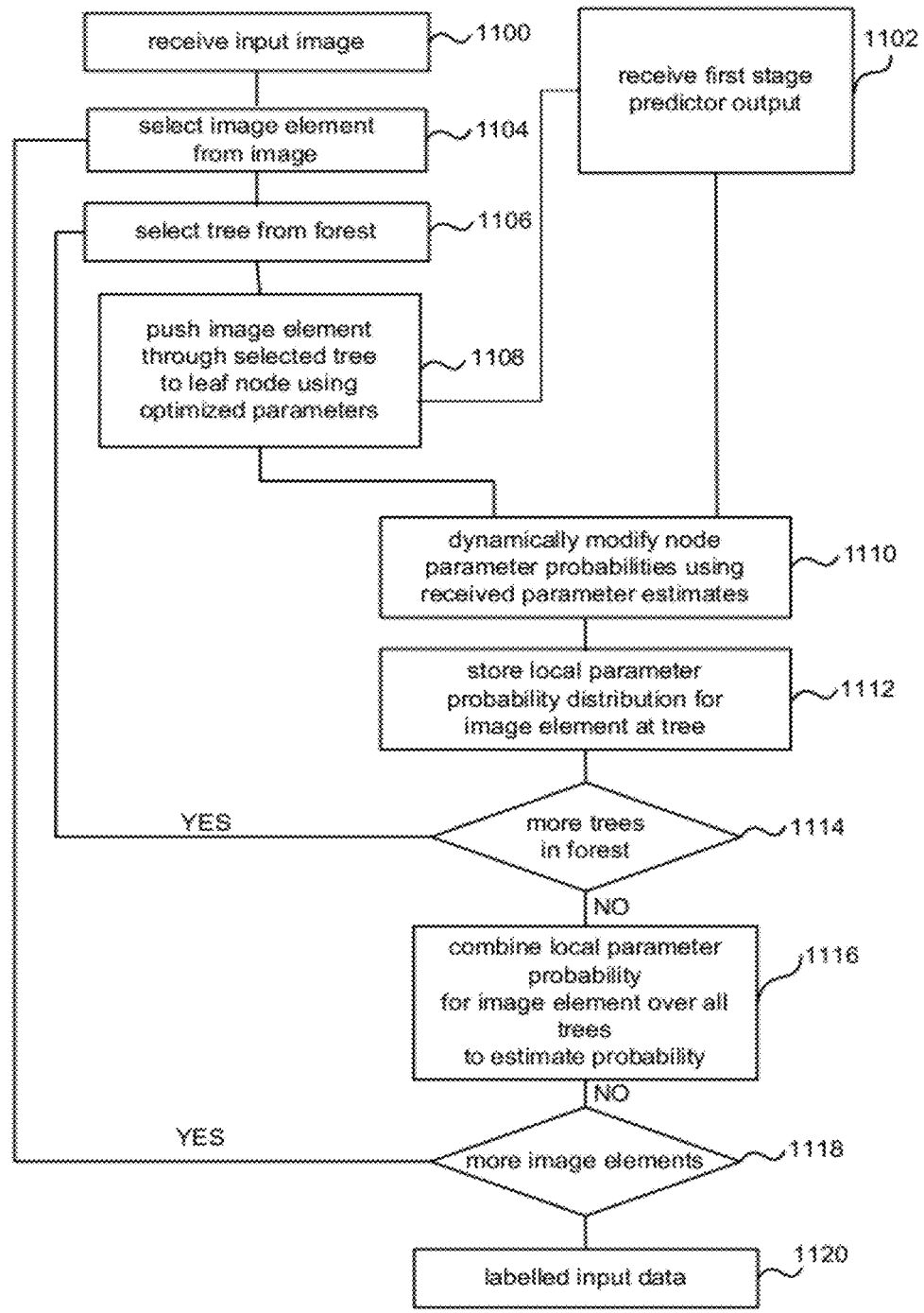
FIG. 11 is a flow diagram of an example method of labeling an image using an adaptive second stage predictor.

FIG. 11 is a flow diagram of an example method of labeling an image using an adaptive second stage predictor. An un-rectified input image is received 1100 at a second stage predictor, output from a first stage predictor 1102, for example global parameter predictions is also received. An image element from the received image is selected 1104 and a trained decision tree from the decision forest is also selected 1106. The selected image element is pushed 1108 through the selected decision tree, such that it is tested against the trained parameters at a node, which are dynamically modified based upon the output received from the first stage predictor and then passed to the appropriate child in dependence on the outcome of the test, and the process repeated until the image element reaches a leaf node.

Dynamic modification 1110 of the trained parameters at the leaf node means that the stored parameters can be adapted based on the output of the first-stage predictor. The use of adaptive parameters allows the tree to be trained using a reduced set of data, as there is no need for the training set to cover all possible poses or all possible body shapes and sizes and additionally with no need for a prior step of rectification. The unseen data also does not have to be rectified before being input to the second-stage predictor. The use of adaptive parameters also allows a tree structure which has previously been trained to be re-purposed thus saving training time and memory resources. The local parameter probability distribution associated with the leaf node is stored 1112 for this image element.

As described above with reference to block 910 of FIG. 9, if it is determined 1114 that there are more decision trees in the forest then the process is repeated until it has been performed for all the decision trees in the forest. The process can also be carried out in parallel.

Once the image element has been pushed through all the trees in the decision forest, then a plurality of local parameter probability distributions are stored for the image element (at least one from each tree). These probability distributions are then combined 1116 to form an overall probability distribution for the image element. Examples of aggregation methods are described above with reference to block 814. Once the overall probability distribution is determined, a local parameter of the image can be estimated.

The process can be repeated 1118 for all unseen image elements. Once all the image elements in the unseen image have been analyzed, then classifications and maximum probabilities are obtained for all image elements and a labeled version of the input image is created 1120.

Figure 12:
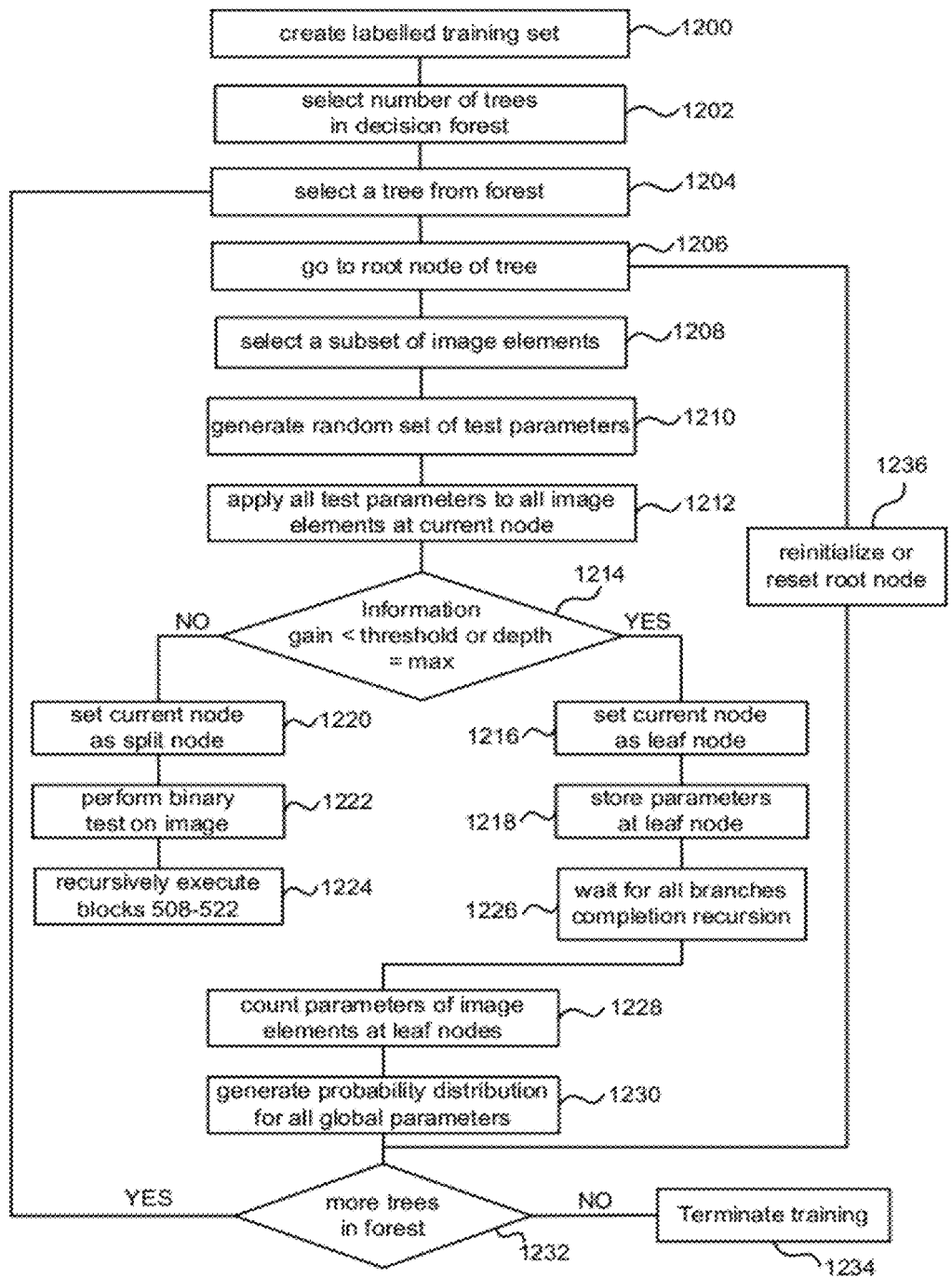
FIG. 12 is a flow diagram of an example method of training a predictor to store multiple parameters.

FIG. 12 is a flow diagram of an example method of training a predictor to store multiple parameters. In some embodiments it may be possible to save memory and training time by re-purposing or re-training the same tree structure to store a plurality of distributions. In an example this may comprise having several switching leaf node distributions or storing a plurality of distributions at each leaf node. In an example a predictor may be trained to estimate both global and local parameters. In another example a predictor may be trained to estimate both in-plane global parameters and out-off plane global parameters. In an embodiment a plurality of parameter estimates may be stored at each leaf node (described herein with reference to FIG. 14).

The training process carried out is similar to that described above with reference to FIG's 6 and 10. If more probability distributions are to be stored at leaf nodes of the tree then the training process can be repeated and a further set of leaf nodes with further stored distributions can optionally be set 1236. In an embodiment the predictor may be trained to store a first set of probabilities at the leaf node and the process can then be repeated in order to store a second or further set of probabilities at the leaf nodes 1236. Training the second set of leaf distributions is quicker than training the first because the structure and feature tests in the tree are already set, therefore testing of random test parameters is reduced. In an example a re-purposed tree stores both distributions over first stage outputs (e.g. quantized height) and second stage outputs (e.g. body parts). In another example, to cope with out-of-plane rotation a second-stage forest is re-purposed to have multiple distributions at each leaf which are switched between according to the output of the first stage. For example, if a person is facing left then the left-facing distribution may be chosen at the leaf. This reuse of the tree structure can save training/test time and memory.

Figure 13:
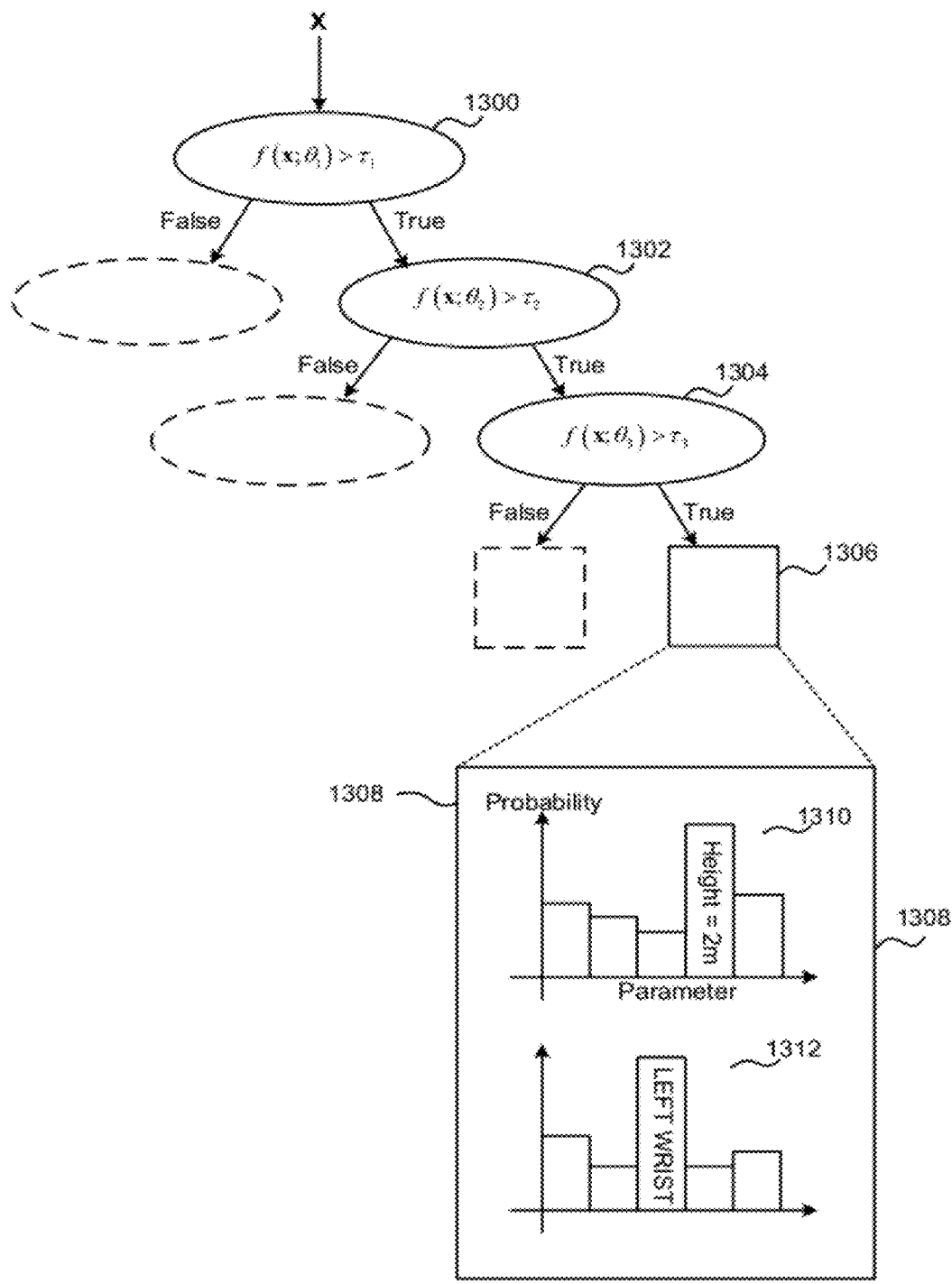
FIG. 13 illustrates a decision tree having multiple parameters stored at the leaf nodes.

FIG. 13 illustrates a decision tree having multiple parameters stored at the leaf nodes. The training algorithm selects a first set of training parameters $\theta_1$ and threshold $\tau_1$ to be the test applied at a root node 1300 of the decision tree. A second set of parameters $\theta_2$ and threshold $\tau_2$ are selected to be applied at the split node 1302 and the testing process is repeated. The training algorithm has selected the third set of parameters $\theta_3$ and threshold $\tau_3$ to be applied at the split node 1304 and the process is repeated again. The image elements in this three-level intersection passing the test are provided to leaf node 1306. At the leaf node 1306, a learned distribution $P_t(c|I, x)$ 1310 over parameter estimates is stored. For example the learned distribution 1310 may be a height distribution.

The training algorithm is re-initialized and a new set of training parameters $\vartheta_1$ and threshold $v_1$ is applied at the initial root node 1300. Parameters $\vartheta_2$ and threshold $v_2$ are selected to be applied at the split node 1302 and the testing process is repeated. The training algorithm has selected a further set of parameters $\vartheta_3$ and threshold $v_3$ to be applied at the split node 1304 and the process is repeated again. The image elements in this three-level intersection passing the test are provided to leaf node 1306. At the leaf node 1306, a learned distribution for another parameter $P_y(c|I, x)$ 1312 over is stored. In an example the learned distribution is a body part label estimate.

In an example where decision trees are arranged to store multiple parameters a first set of parameters may be in in-plane parameters, and a second set of parameters may be out-of plane parameters. In another example the first set of parameters may be global parameters and the second set of parameters may be local parameters. While in the examples described above there are two sets of stored parameters there may be multiple levels as required.

Figure 14:
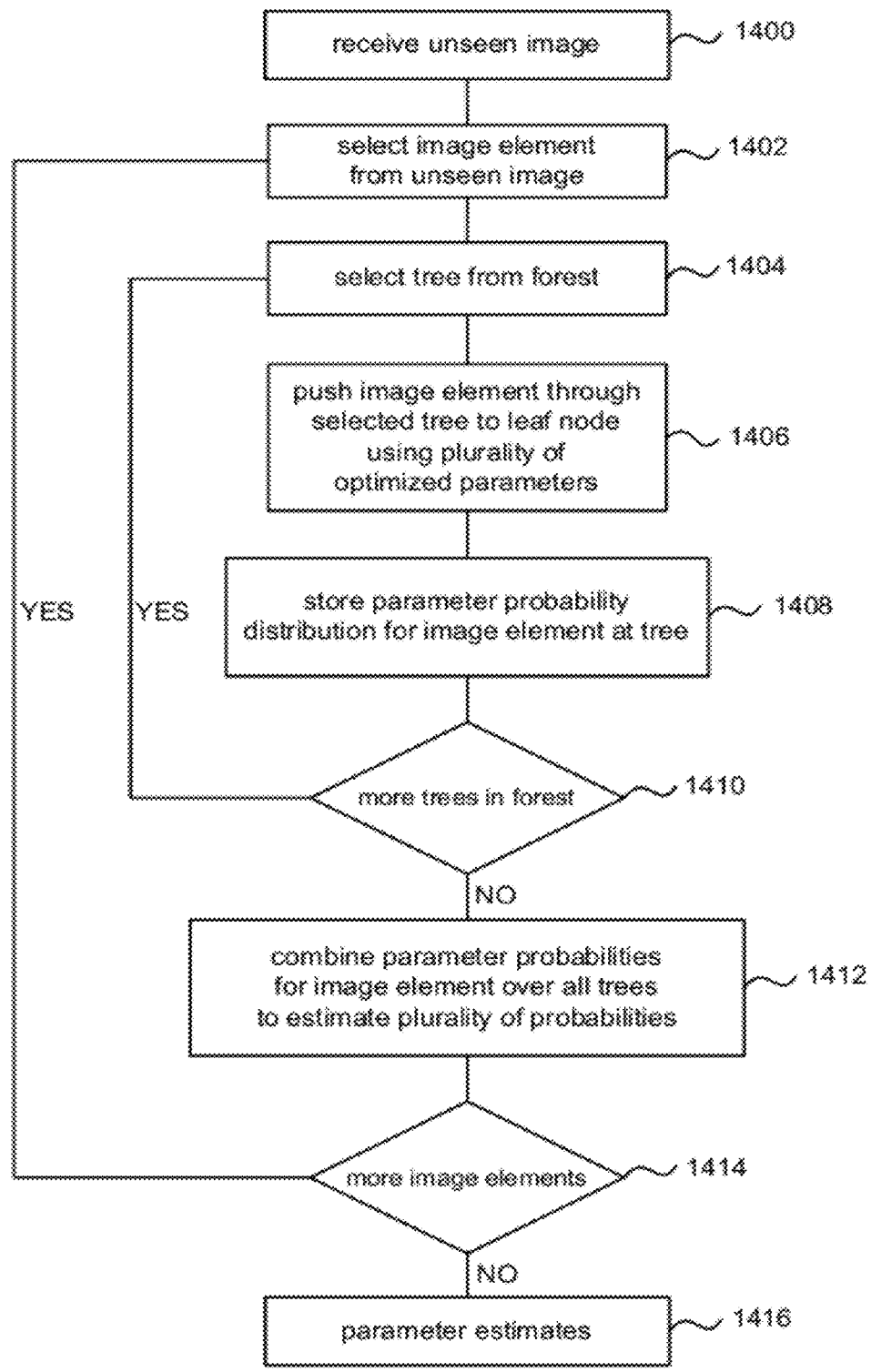
FIG. 14 is a flow diagram of an example method of labeling an image using a decision tree with multiple parameters stored at the leaf nodes.

FIG. 14 is a flow diagram of an example method of body part labeling using a decision tree with multiple stored parameters trained as described with reference to FIG. 12. An input image is received 1400 at the predictor and an image element is selected 1402. The input image may be a rectified image or may be unrectified, depending on whether the tree has been trained to estimate global or local parameters. A trained decision tree from the decision forest is also selected 1404. The selected image element is pushed 1406 through the selected decision tree, such that it is tested against the trained parameters at a node. In an example decision tree as described as reference to FIG. 13 there is a plurality of sets of parameters stored at the leaf nodes. The multiple parameter probability distributions associated with the leaf node is stored 1408 for this image element.

If it is determined there are more levels of nodes in the tree the process can be repeated 1410 until a final leaf node is reached. If it is determined 1412 that there are more decision trees in the forest, then the process is repeated until there are no trees left in the forest. This can be carried out in parallel.

The stored probability distributions are then combined 1414 to form a plurality of overall probability distributions for the image element. Once the overall probability distribution is determined, a plurality of parameters of the image can be estimated 1416. For example at least one global parameter and at least one local parameter of the image may be.

Figure 15:
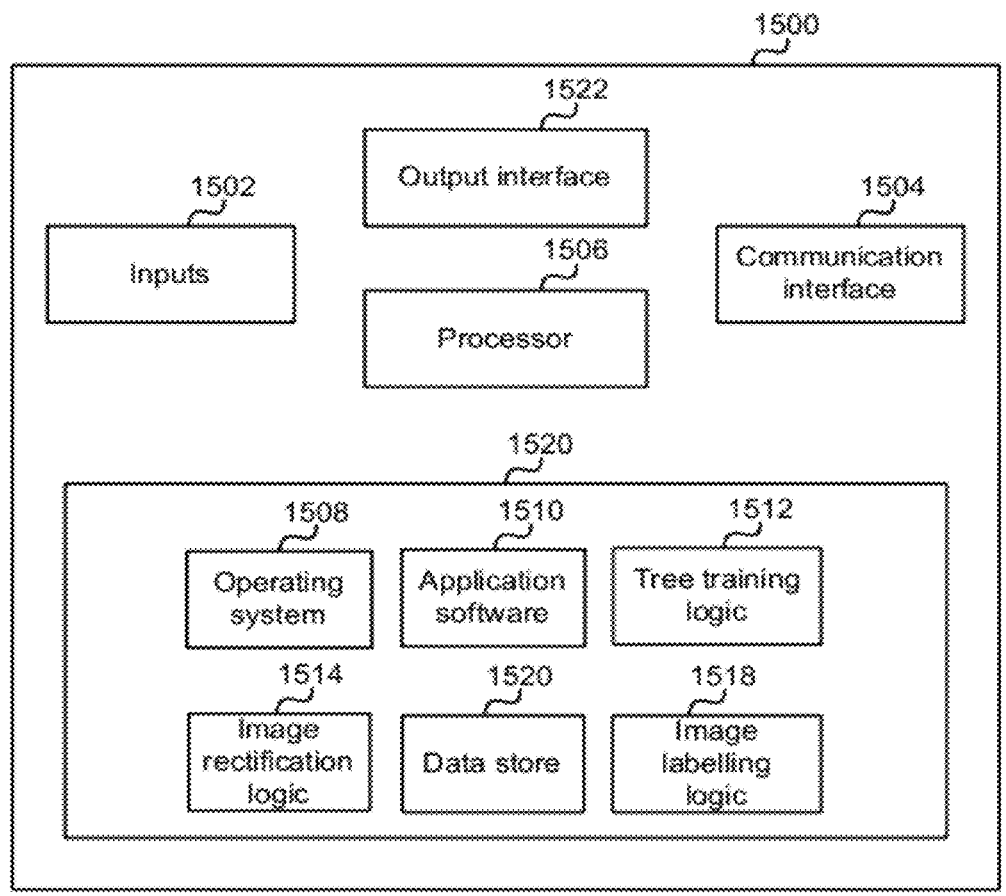
FIG. 15 illustrates an exemplary computing-based device in which embodiments of an image labeling system may be implemented.

FIG. 15 illustrates various components of an exemplary computing-based device 1500 which may be implemented as any form of a computing and/or electronic device, and in which embodiments of a image labeling system may be implemented.

The computing-based device 1500 comprises one or more inputs 1502 which are of any suitable type for receiving media content, Internet Protocol (IP) input, volumetric image data, input from medical devices, input from image capture devices, input from users, input from other computing-based devices. The device also comprises communication interface 1504.

Computing-based device 1500 also comprises one or more processors 1506 which may be microprocessors, controllers or any other suitable type of processors for processing computing executable instructions to control the operation of the device in order to carry out pose estimation. In some examples the processor may be a central processing unit (CPU). In other examples the processor may be Graphics processing unit (GPU). In some examples, for example where a system on a chip architecture is used, the processors 1506 may include one or more fixed function blocks (also referred to as accelerators) which implement a part of the method of image labeling in hardware (rather than software or firmware). Platform software comprising an operating system 1508 or any other suitable platform software may be provided at the computing-based device to enable application software 1510 to be executed on the device.

Further software that can be provided at the computing-based device 1500 includes training logic 1512 (which implements the techniques described for training a decision tree, or other appropriate training techniques), image analysis logic 1214 (which implements techniques of passing an unseen image through a regression tree as described herein), image rectification logic 1216 (which computes global parameters as described herein).

The computer executable instructions may be provided using any computer-readable media that is accessible by computing based device 1500. Computer-readable media may include, for example, computer storage media such as memory 1520 and communications media. Computer storage media, such as memory 1520, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1520) is shown within the computing-based device 1500 it will be appreciated that the storage may be distributed or located remotely and accessed via a network or other communication link (e.g. using communication interface 1504).

An output is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of image labeling comprising:
   receiving at least one image;
   computing, by a first stage predictor, at least one global parameter of the image; and
   modifying an image labeling process according to the computed global parameter, the at least one global parameter being one of: a game context action, age, and gender, modifying the image labeling process including dynamically modifying a second stage predictor using the computed global parameter;
   wherein computing the global parameter comprises:
   selecting a subset of image elements in the image;
   for each selected image element determining a probability that the image element depicts an object having a specified global parameter; and
   combining the probability from a plurality of the selected image elements to compute an estimate of the global parameter, wherein computing the global parameter also includes ensuring all available global parameter values are associated with a non-zero probability.

2. A method as claimed in claim 1 wherein modifying the image labeling process comprises rectifying the at least one input image using the at least one computed global parameter.

3. A method as claimed in claim 1 wherein modifying the image labeling process comprises dynamically modifying at least one stored parameter of the image labeling process during use of the image labeling process to label the image.

4. A method as claimed in claim 1 wherein the image labeling process comprises a random forest and modifying the image labeling process comprises using different distributions stored at leaf nodes of the random forest or changing feature tests and thresholds at nodes of the random forest.

5. A method according to claim 1 wherein computing the global parameter comprises using a classification forest comprising a plurality of classification trees.

6. A method according to claim 1 wherein computing the global parameter comprises using a regression forest comprising a plurality of regression trees.

7. A method according to claim 5 wherein combining the probabilities from a plurality of the selected image elements to compute an estimate of the global parameter comprises aggregating the probabilities stored at all of the leaf nodes in the forest for a set of image elements.

8. A method according to claim 6 wherein combining the probabilities from a plurality of the selected image elements to compute an estimate of the global parameter comprises using the stored probabilities from a subset of leaf nodes wherein the subset of leaf nodes comprises the most confident leaf nodes within the regression forest.

9. A method according to claim 1 wherein the image labeling process is trained using a set of training data comprising images with specified labels and where the set of training data comprises only images which have had the variations of at least one global parameter accounted for, either by image rectification or by feature adaptation.

10. A method as claimed in claim 1 wherein the image labeling process is trained using a set of training data comprising images with specified labels and wherein the method comprises rectifying the training data using the at least one global parameter.

11. A method of pose estimation comprising;
    receiving at least one image depicting at least part of one human or at least part of one animal;
    computing, by a first stage predictor, for the at least one image at least one global parameter describing image level characteristics of the at least one human or animal, the at least one global parameter being age; and
    rectifying the at least one image using the global parameter prior to inputting that image to an image labeling process to obtain an estimate of a pose of the human or animal, the image labeling process including using a second stage predictor that is trained using training data that is rectified using the global parameter;
    wherein computing the global parameter comprises;
    selecting a subset of image elements in the image;
    for each selected image element determining a probability that the image element depicts an object having a specified global parameter; and
    combining the probabilities from a plurality of the selected image elements to compute an estimate of the global parameter, wherein computing the global parameter also includes ensuring all available global parameter values are associated with a non-zero probability.

12. A method as claimed in claim 11 wherein computing the global parameter comprises using at least one of; a classifier, support vector machine, regression forest, classification forest, relevance vector machine; having been trained to predict a global parameter, using a set of labeled training data.

13. A method as claimed in claim 11 further comprising computing a second global parameter; wherein computing the second global parameter comprises using at least one of a regression forest or a classification forest which comprises a plurality of regression or classification trees trained to predict global parameters, wherein global parameter predictions for each of the global parameters are stored at each leaf node of each tree.

14. A method as claimed in claim 11 wherein computing a global parameter comprises using at least one of; a classifier, support vector machine, regression forest, classification forest, relevance vector machine; having been trained using one of recursive, iterative or breadth first training.

15. A method as claimed in claim 13 wherein the regression or classification forest is trained using a first set of training data for the first global parameter being predicted; and the training is repeated using a second set of training data for the second global parameter being predicted.

16. A human or animal pose estimation system comprising:
at an input arranged to receive at least one image depicting at least part of a human or at least part of an animal; and
a processor arranged to compute at least one global parameter of the image using a first stage predictor, the at least one global parameter being a game context action, the processor being arranged to:
select a subset of image elements in the image;
for each selected image element determine a probability that the image element depicts an object having a specified global parameter; and
combine the probability from a plurality of the selected image elements to compute an estimate of the global parameter, the first stage predictor ensuring all available global parameter values are associated with a non-zero probability;
the processor being further arranged to modify an image labeling process of a second stage predictor according to the computed global parameter by using different distributions stored at leaf nodes of a random forest based on the computed global parameter or by changing, based on the computed global parameter, features tests and thresholds at nodes of the random forest to obtain an estimate of a pose of the human or animal depicted in the image.

17. A system according to claim 16 wherein the at least one image is received from one of; a depth camera and a medical imaging device.

18. A gaming apparatus comprising a human or animal pose estimation system as claimed in claim 16.

19. A gaming apparatus as claimed in claim 16 which is arranged to influence the course of a game using the estimated pose of the human or animal.

* * * * *